United States Patent
Hana et al.

(10) Patent No.: US 12,313,601 B2
(45) Date of Patent: May 27, 2025

(54) CRACK ESTIMATION DEVICE AND CRACK ESTIMATION METHOD

(71) Applicant: Mitsubishi Electric Corporation, Tokyo (JP)

(72) Inventors: Norihiko Hana, Tokyo (JP); Masao Akiyoshi, Tokyo (JP); Masaki Umeda, Tokyo (JP); Kenji Amaya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 352 days.

(21) Appl. No.: 18/015,726

(22) PCT Filed: Sep. 16, 2020

(86) PCT No.: PCT/JP2020/035007
§ 371 (c)(1),
(2) Date: Jan. 12, 2023

(87) PCT Pub. No.: WO2022/059080
PCT Pub. Date: Mar. 24, 2022

(65) Prior Publication Data
US 2023/0251170 A1   Aug. 10, 2023

(51) Int. Cl.
*G01N 3/06*   (2006.01)

(52) U.S. Cl.
CPC ....... *G01N 3/06* (2013.01); *G01N 2203/0066* (2013.01); *G01N 2203/0212* (2013.01)

(58) Field of Classification Search
CPC ............ G01N 3/06; G01N 2203/0066; G01N 2203/0212; G01N 3/08; G01N 3/20
See application file for complete search history.

(56) References Cited

U.S. PATENT DOCUMENTS 5,534,289 A * 7/1996 Bilder .................... G01N 21/91
                                                    73/104
9,792,555 B2 * 10/2017 Guan ....................... G06F 30/20
(Continued)

FOREIGN PATENT DOCUMENTS

CN          115046872 A  *  9/2022
DE       102017112804 A1 * 12/2018
(Continued)

OTHER PUBLICATIONS

International Search Report and Written Opinion mailed on Dec. 8, 2020, received for PCT Application PCT/JP2020/035007, filed on Sep. 16, 2020, 8 pages including English Translation.
(Continued)

*Primary Examiner* — Octavia Hollington
(74) *Attorney, Agent, or Firm* — XSENSUS LLP

(57) ABSTRACT

A crack estimation device which accurately estimates a crack inside a structure is provided. The crack estimation device includes: a measurement unit which measures deformation of a measurement plane as a measurement plane deformation vector; a model generation unit which sets deformation of the measurement plane when a crack is generated in a crack generation plane, as a measurement plane estimated change vector for multiple types of crack candidates; and a crack state analysis unit which obtains a similarity between the measurement plane deformation vector and the measurement plane estimated change vector, normalizes the similarity, and estimates the crack generated in the crack generation plane from a result obtained by multiplying a vector of a state quantity indicating a state of the crack generation plane by the normalized similarity for each crack candidate, and adding together results of the multiplication for all the crack candidates.

14 Claims, 33 Drawing Sheets

(56) References Cited

U.S. PATENT DOCUMENTS

| | | | |
|---|---|---|---|
| 11,428,612 B2 * | 8/2022 | Hana | G01N 3/08 |
| 11,441,984 B2 * | 9/2022 | Kazymyrenko | G01M 5/0033 |
| 2022/0082482 A1 | 3/2022 | Hana et al. | |
| 2023/0003626 A1 * | 1/2023 | Hana | G01M 5/0016 |
| 2023/0049804 A1 * | 2/2023 | Hana | G01N 3/08 |
| 2023/0417540 A1 * | 12/2023 | Saji | G01C 21/12 |
| 2024/0353287 A1 * | 10/2024 | Hana | G01M 7/025 |

FOREIGN PATENT DOCUMENTS

| | | |
|---|---|---|
| JP | S60-196642 A | 10/1985 |
| JP | 2012-159477 A | 8/2012 |
| JP | 2013-096862 A | 5/2013 |
| JP | 6120307 B2 | 4/2017 |
| KR | 101618361 B1 * | 5/2016 |
| WO | 2021/149170 A1 | 7/2021 |
| WO | 2021/152811 A1 | 8/2021 |

OTHER PUBLICATIONS

"Individual Identification of Contact Pressure Distribution of Inner and Outer Brake Pad Using Inverse Analysis", Transactions of the Japan Society for Computational Methods in Engineering, vol. 16, No. 24-161202, Dec. 2016, 3 pages including English Translation.
U.S. Appl. No. 17/781,708, filed Jun. 2, 2022, Norihiko Hana, et al. (Corresponding to WO2021/149170 A1 cited).
U.S. Appl. No. 17/794,271, filed Jul. 21, 2022, Norihiko Hana, et al. (Corresponding to WO2021/152811 A1 cited).

* cited by examiner

FIG. 14

$$\begin{bmatrix} \Gamma^{(0)}_{(0,0)} & \cdots & \Gamma^{(q)}_{(0,0)} & \cdots & \Gamma^{(s)}_{(i,0)} & \cdots & \Gamma^{(q)}_{(n,0)} \\ \Delta^{(0)}_{(0,0)} & \cdots & \Delta^{(q)}_{(0,0)} & \cdots & \Delta^{(s)}_{(i,0)} & \cdots & \Delta^{(q)}_{(n,0)} \\ Z^{(0)}_{(0,0)} & \cdots & Z^{(q)}_{(0,0)} & \cdots & Z^{(s)}_{(i,0)} & \cdots & Z^{(q)}_{(n,0)} \\ E^{(0)}_{(0,0)} & \cdots & E^{(q)}_{(0,0)} & \cdots & E^{(s)}_{(i,0)} & \cdots & E^{(q)}_{(n,0)} \end{bmatrix}$$

CRACK ESTIMATION DEVICE AND CRACK ESTIMATION METHOD

CROSS-REFERENCE TO RELATED APPLICATION

The present application is based on PCT filing PCT/JP2020/035007, filed Sep. 16, 2020, the entire contents of which are incorporated herein by reference.

TECHNICAL FIELD

The present disclosure relates to a crack estimation device and a crack estimation method.

BACKGROUND ART

Mechanical structural components generally have portions that cannot be inspected by visual inspection, and crack expansion may occur without being noticed by normal inspection, which may affect the life of a mechanical structure. For example, in a rotating electric machine applied to a turbine electric generator, a crack inside a rotor structure cannot be inspected by ordinary visual inspection, so that crack expansion may occur without being noticed by normal inspection, which may affect the life of the turbine electric generator including the rotor structure. Therefore, a crack size estimation method is known as a non-destructive inspection method for inspecting cracks inside a structure (see, for example, Patent Document 1).

CITATION LIST

Patent Document

Patent Document 1: Japanese Laid-Open Patent Publication No. 2012-159477

SUMMARY OF THE INVENTION

Problems to be Solved by the Invention

In a conventional crack size estimation method, the position and the size of a crack inside a structure are estimated by inverse analysis in which a crack inside the structure is derived from changes in the shape of the surface of the structure. To perform the inverse analysis, it is necessary to solve an inverse problem. To solve the inverse problem, three requirements have to be satisfied: the solution of the inverse problem can be uniquely determined as uniqueness of solution, the solution of the inverse problem exists as existence of solution, and the stability of the inverse problem as stability of solution can be maintained. However, depending on the results of strain measurement, the three requirements of "uniqueness of solution", "existence of solution", and "stability of solution" are not satisfied in some cases. If any one of these three requirements is not satisfied, the inverse problem becomes a poorly set problem, that is, an improper problem, and the accuracy of crack estimation is reduced.

The present disclosure has been made to solve the above problem, and an object of the present disclosure is to provide a crack estimation device capable of accurately estimating a crack inside a structure.

Solution to the Problems

A crack estimation device according to the present disclosure includes: a measurement unit which sets an observation plane in a surface of a structure as a measurement plane and measures deformation of the measurement plane as a measurement plane deformation vector; a model generation unit which generates a shape model obtained by modeling a shape of the structure, sets a candidate plane inside the structure as a crack generation plane, and sets deformation of the measurement plane when a crack is generated in the crack generation plane, as a measurement plane estimated change vector for a plurality of types of crack candidates; and a crack state analysis unit which estimates the crack from output of the measurement unit and output of the model generation unit, wherein the crack state analysis unit obtains a similarity between the measurement plane deformation vector and the measurement plane estimated change vector, normalizes the similarity, and estimates the crack generated in the crack generation plane from a result which is obtained by multiplying a vector of a state quantity indicating a state of the crack generation plane by the normalized similarity for each of the crack candidates, and adding together results of the multiplication for all the crack candidates.

Effect of the Invention

In the crack estimation device according to the present disclosure, the similarly between the measurement plane deformation vector and the measurement plane estimated change vector is obtained, the similarly is normalized, and the crack generated in the crack generation plane inside the structure is estimated from the result which is obtained by multiplying the vector of the state quantity indicating the state of the crack generation plane by the normalized similarity for each of the crack candidates, and adding together the results of the multiplication for all the crack candidates. Therefore, it is possible to accurately estimate the crack inside the structure.

BRIEF DESCRIPTION OF THE DRAWINGS

FIG. 14 shows learning data in Embodiment 1.

DESCRIPTION OF EMBODIMENTS

Figure 1:
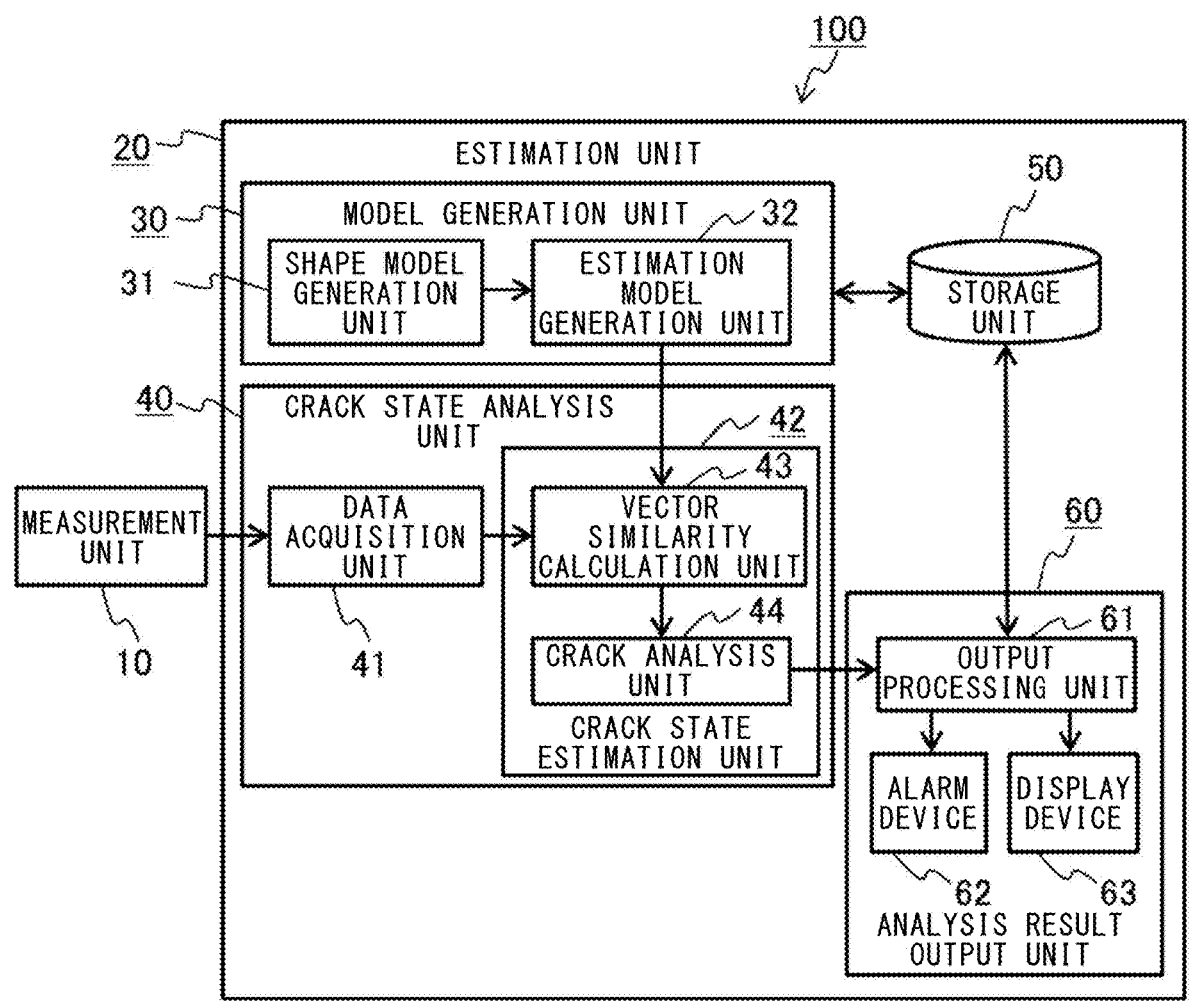
FIG. 1 is a block diagram showing the configuration of a crack estimation device according to Embodiment 1.

Hereinafter, crack estimation devices according to embodiments for carrying out the present disclosure will be described in detail with reference to the drawings. In the drawings, the same reference characters denote the same or corresponding parts.

Embodiment 1

Figure 2:
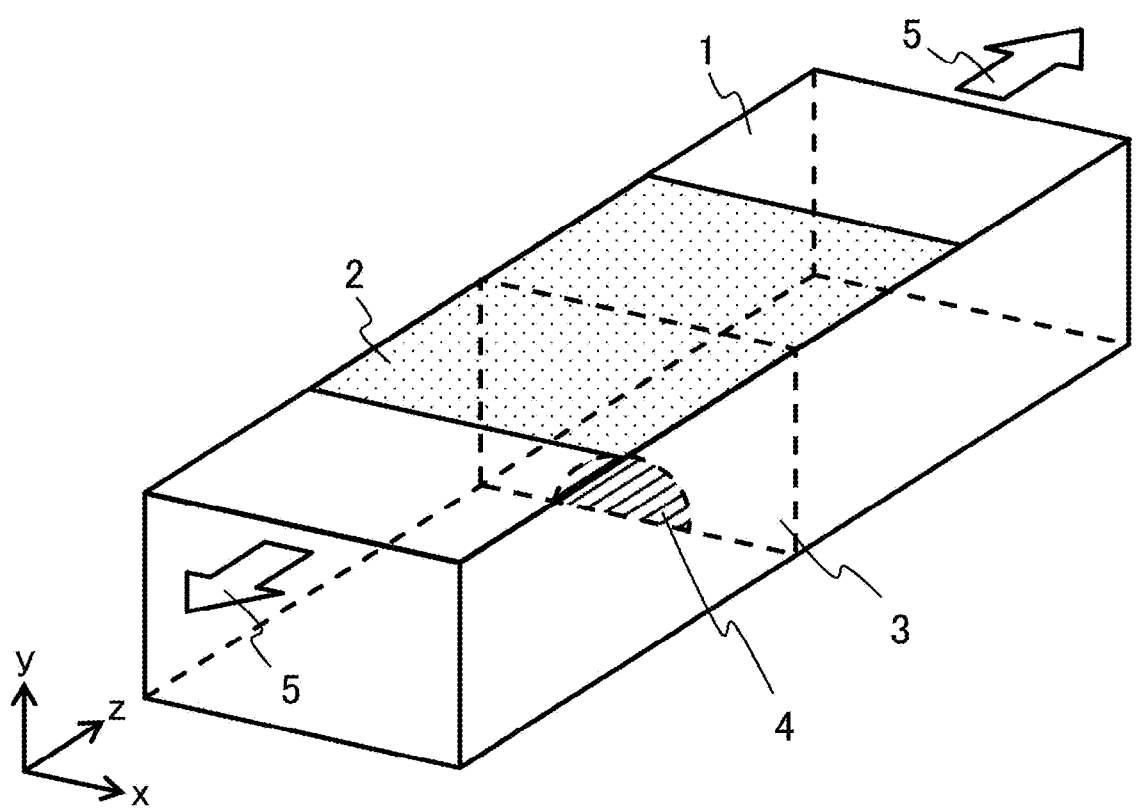
FIG. 2 is a perspective view of a structure in a state where a tensile load is applied thereto in Embodiment 1.
Figure 3:
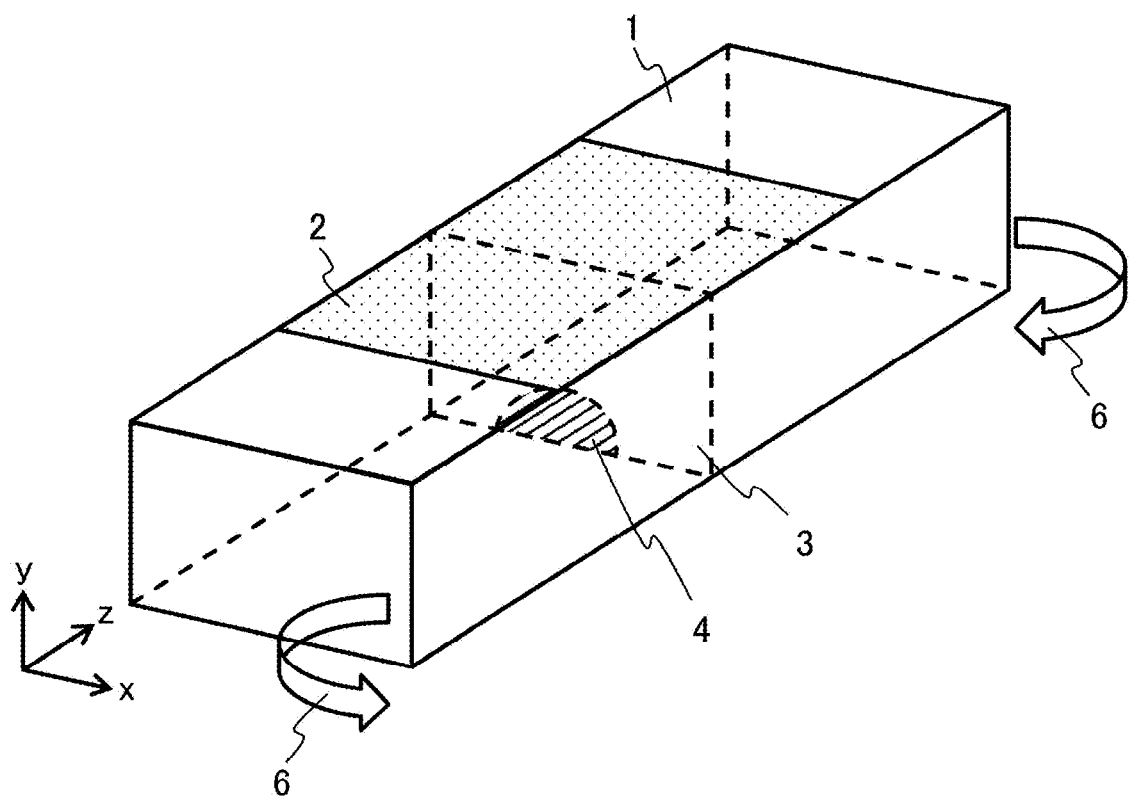
FIG. 3 is a perspective view of the structure in a state where a bending moment is applied thereto in Embodiment 1.

FIG. 1 is a block diagram showing the configuration of a crack estimation device 100 according to Embodiment 1. FIG. 2 is a perspective view showing a state where a tensile load 5 is applied to a structure 1, which is an estimation target of the crack estimation device 100 according to Embodiment 1, when the structure 1 is a flat plate. FIG. 3 is a perspective view showing a state where a bending moment 6 is applied to the structure 1, which is an estimation target of the crack estimation device 100 according to Embodiment 1, when the structure 1 is a flat plate.

As shown in FIG. 1, the crack estimation device 100 includes a measurement unit 10 and an estimation unit 20. The estimation unit 20 estimates the position and the size of a crack 4 inside the structure 1 shown in FIG. 2 and FIG. 3.

A candidate plane 3 is set inside the structure 1, and an observation plane 2 is set in the surface of the structure 1. In FIG. 2 and FIG. 3, the flat plate which is the structure 1 is represented in an orthogonal coordinate system, the plane on which the observation plane 2 is set is defined as an xz plane, and the plane on which the candidate plane 3 is set is defined as an xy plane. The candidate plane 3 is set at a location where generation of the crack 4 is expected. The observation plane 2 is set in a range where the surface of the structure 1 changes due to a change of the candidate plane 3.

The measurement unit 10 of the crack estimation device 100 sets at least a part of the surface of the structure 1 as the observation plane 2, and measures surface deformation of the observation plane 2. The measurement unit 10 is, for example, a strain gauge attached to the observation plane 2. The strain gauge includes a base material and a resistance material. The base material is composed of an electrical insulator. The resistance material is attached to the base material, and a lead wire is provided at a portion thereof protruding from the base material. The base material is attached to the surface of the structure 1 via an adhesive, and when the base material expands or contracts, the resistance material also expands or contracts, and the electric resistance of the resistance material changes. The lead wire of the resistance material is connected to a data acquisition unit 41 of the estimation unit 20. For example, when a strain is generated in the surface of the structure 1, the resistance material expands and contracts, and the electric resistance of the resistance material changes. The change in the electric resistance of the resistance material is transmitted to the data acquisition unit 41 of the estimation unit 20 via the lead wire. As described above, a strain change on the surface of the structure 1 is measured by the strain gauge, and the measurement result is inputted to the data acquisition unit 41 of the estimation unit 20. With such a configuration, in the state where the tensile load 5 in FIG. 2 or the bending moment 6 in FIG. 3 is applied, the measurement unit 10 can measure a strain change on the observation plane 2 which is in the surface of the structure 1. The measurement unit 10 sets the observation plane 2 as a measurement plane and measures deformation of the measurement plane as a measurement plane deformation vector.

The measurement unit 10 may include an optical device such as a digital camera, and a device which analyzes image information acquired by the optical device. In this case, a strain on the surface of the observation plane 2 is measured in a non-contact manner by determining a correlation of the image information acquired by the optical device.

The estimation unit 20 estimates the crack 4 inside the structure 1 on the basis of the change on the measurement plane measured by the measurement unit 10. The estimation unit 20 estimates the crack 4 inside the structure 1 by inverse analysis using the relationship between shape change on the surface of the structure 1 and the crack 4 inside the structure 1. The phases processed by the estimation unit 20 include a learning phase and an inverse analysis phase. The inverse analysis phase is processed after the learning phase. In the learning phase, the relationship between the crack 4 inside the structure 1 and shape change on the surface of the structure 1 is prepared in advance as learning data. In the inverse analysis phase, the position and the size of the crack 4 are estimated as information of the crack 4 inside the structure 1 by using the learning data prepared in the learning phase.

For such estimation, learning data and a least-squares method are usually used, so that it is necessary to obtain a pseudo-inverse matrix. Therefore, such estimation boils down to solving an inverse problem. To solve the inverse problem, three requirements including "uniqueness of solution", "existence of solution", and "stability of solution" need to be satisfied. However, depending on the measurement results of a strain on the measurement plane by the measurement section 10 and the learning data, these three requirements are not satisfied in some cases. For example, if the number of unknown quantities is greater than the number of observed quantities, there are countless solutions, so that "uniqueness of solution" is not satisfied. For example, if the number of unknown quantities is smaller than the number of observed quantities, there is no solution, so that "existence of solution" is not satisfied. For example, even when a strain is generated in the structure 1 due to stress generated in the structure 1, if the effect of the strain diminishes more rapidly with increasing distance from the portion where the strain is generated, "stability of solution" is not satisfied. Therefore, the inverse problem may become a poorly set problem, that is, an improper problem. Therefore, even when an attempt to estimate the position and the size of the crack 4 is made by using the learning data, if the inverse problem is an improper problem, there may be no pseudo-inverse matrix.

Therefore, in the crack estimation device 100 according to Embodiment 1, a shape model generation unit 31 of the estimation unit 20 models the shape of the structure 1 into a shape model. Furthermore, an estimation model generation unit 32 generates learning data as an estimation model from the shape model. A crack state estimation unit 42 of the estimation unit 20 obtains the similarity between the learning data as the estimation model and the measurement plane deformation vector acquired by the measurement unit 10. The obtained similarity is normalized such that a total value thereof is 1, to obtain a coefficient vector. Furthermore, the crack state estimation unit 42 of the estimation unit 20 sets the candidate plane 3 as a crack generation plane and estimates the change on the crack generation plane on the basis of the coefficient vector and another part of the estimation model.

An analysis result output unit 60 displays a remaining use period of the structure 1, or issues an alarm to stop using the structure 1, on the basis of information of the structure 1 acquired from a storage unit 50, information of a load, applied to the structure 1, acquired from a crack analysis unit 44, and the estimation results of the crack 4.

A model generation unit 30 includes the shape model generation unit 31 and the estimation model generation unit 32. The shape model generation unit 31 generates a shape model. The estimation model generation unit 32 generates a structural analysis model from the shape model, and generates an estimation model from the structural analysis model. The estimation model to be generated is different depending on the structural analysis model. The structural analysis model is a model used when structural analysis is performed.

In order for the structural analysis to be performed, a structural analysis model and boundary conditions for the structural analysis model are required. The boundary conditions include a load condition and a constraint condition. Therefore, the structural analysis requires three items, the structural analysis model, the load condition, and the constraint condition.

When the structural analysis is performed using a structural analysis model, a load condition and a constraint condition are defined. As the load condition, where and how much load is applied to the structure, that is, vector information of a force at a portion, of the structural model, to which the load is applied, is defined. Meanwhile, as the constraint condition, where and how the structure is supported, that is, information that makes the amount of deformation to be zero at the supported portion in the structural analysis model, is defined.

The boundary conditions are conditions different depending on the shape model to be generated. The shape model is a model of an inspection target that is generated as the entirety or a part of the structure 1 on the basis of the measurement plane and the crack generation plane.

When the entirety of the structure 1 is used as the shape model, a temperature distribution may be added as a further boundary condition. When the temperature distribution is used, for example, information of a known uniform temperature distribution at a set initial temperature is first added as a load to the structural analysis model, and then the entire model is expanded or contracted at an analysis temperature different from the set initial temperature on the basis of the difference between the initial temperature and the analysis temperature, whereby the structural analysis is performed.

When a part of the structure 1 is used as the shape model, information of a displacement change or information of a load distribution on a plane cut out as the part of the structure 1 is given as a boundary condition.

When the structural analysis is performed on the basis of the boundary conditions, a model in which the measurement plane and the crack generation plane of the shape model are divided in a lattice shape is used as the structural analysis model. The crack generation plane is generated as a part of the structural analysis model by dividing the candidate plane 3 in a lattice shape. The measurement plane is generated as another part of the structural analysis model by dividing the observation plane 2 in a lattice shape.

Figure 4:
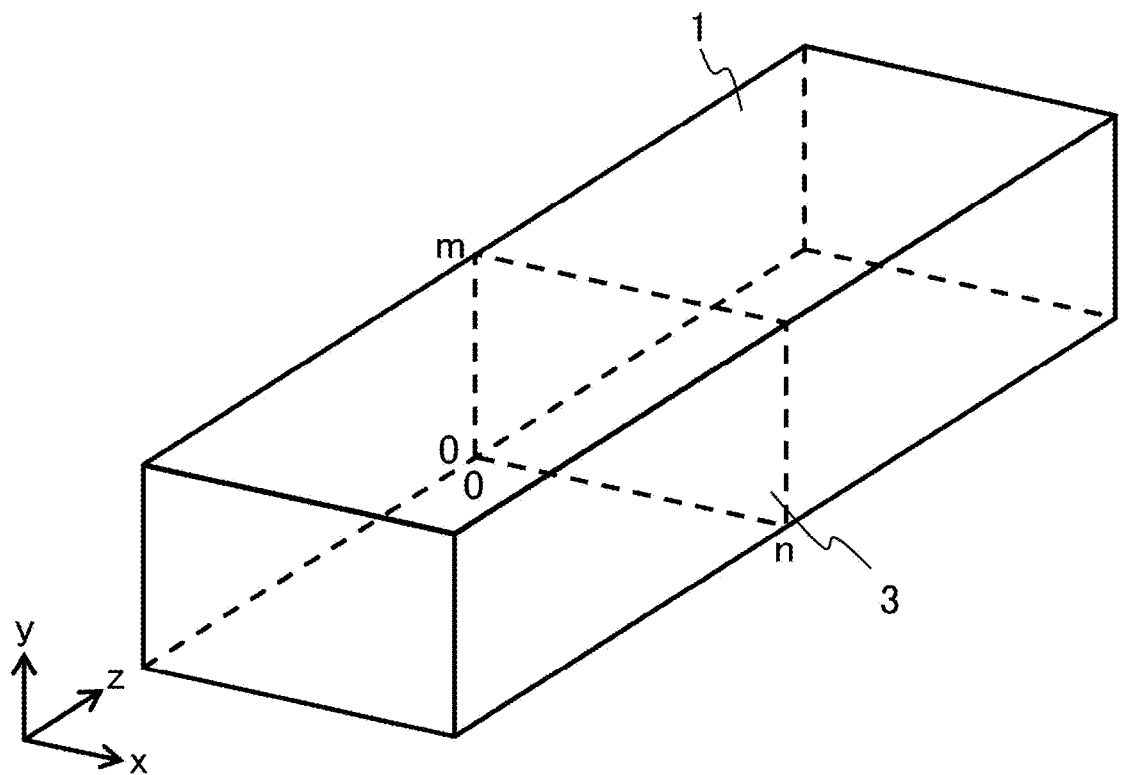
FIG. 4 shows reference coordinates set on a candidate plane of the structure in Embodiment 1.
Figure 5:
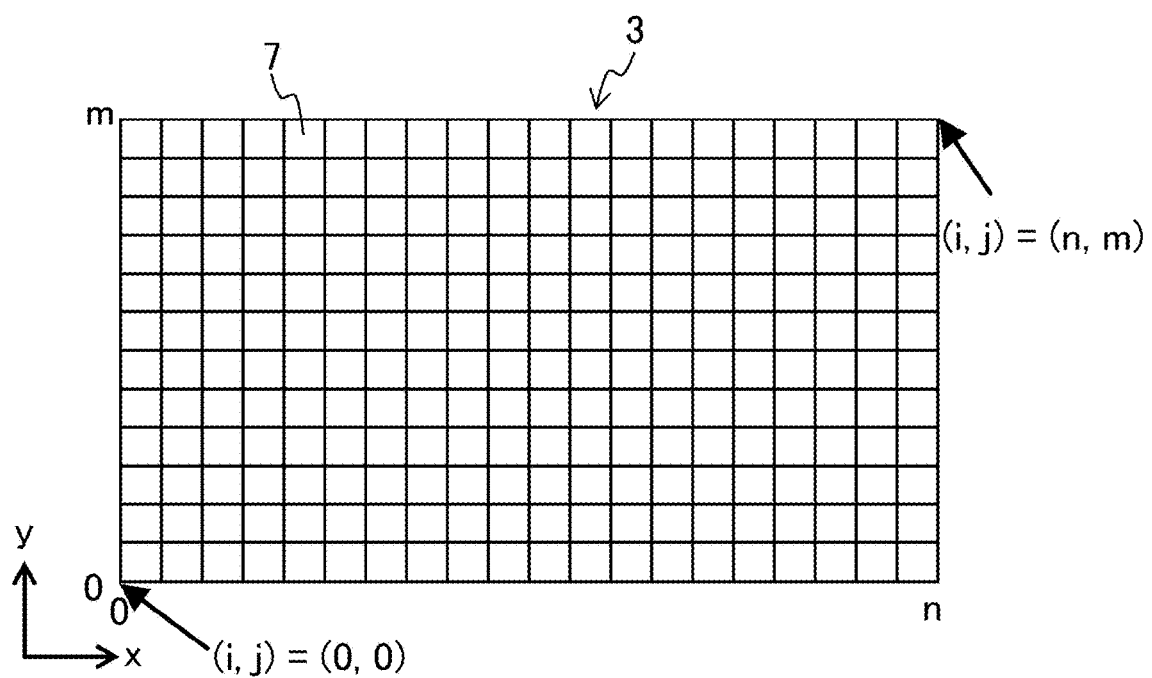
FIG. 5 shows a state where the candidate plane is divided into elements in Embodiment 1.

FIG. 4 shows an example of reference coordinates set on the candidate plane 3 of the structure 1 in FIG. 2 and FIG. 3. FIG. 5 shows a state where the candidate plane 3 in FIG. 4 is divided into elements 7. The candidate plane 3 is divided into n elements in an x-axis direction and m elements in a y-axis direction, and intersection points in a lattice resulting from the division are indicated as positions (i, j). The positions (i, j) are represented by numbers from (0, 0) to (n, m). When the intersection points in the lattice are defined as nodes, each node is a point located on a line forming the elements 7. Each element 7 is shown as a square in FIG. 5, but is not limited thereto, and may be, for example, a trapezoid.

The structural analysis of the crack generation plane is performed for each node position on the crack generation plane. For example, if the crack 4 has been generated at the node at the position (0, 0) on the crack generation plane, the structural analysis is performed for displacement changes at all the nodes on the crack generation plane from the position (0, 0) to the position (n, m) on the crack generation plane. In this case, the node at the position (0, 0) corresponds to the crack 4, and thus is hollow. Therefore, a displacement change occurs at the position (0, 0). Meanwhile, it is assumed that there is no crack 4 at the nodes at the positions other than (0, 0), and thus no displacement change in the load direction occurs at these positions depending on the boundary conditions. In addition, by performing the structural analysis of displacement change on the crack generation plane for each node position as described above, the number of learning data is limited, and the time for generating learning data can be limited.

Next, for example, if the crack 4 has been generated at the node at the position (0, 1) on the crack generation plane, the structural analysis is performed for displacement changes at all the nodes on the crack generation plane from the position (0, 0) to the position (n, m) on the crack generation plane. In this case, the node at the position (0, 1) corresponds to the crack 4, and thus is hollow. Therefore, a displacement change occurs at the position (0, 1). Meanwhile, it is assumed that there is no crack 4 at the nodes at the positions other than (0, 1), and thus no displacement change in the load direction occurs at these positions depending on the boundary conditions.

Thereafter, also, for the nodes at the positions other than (0, 0) and (0, 1) on the crack generation plane, the structural analysis is similarly performed for displacement changes at all the nodes on the crack generation plane. That is, assuming that the crack 4 has bee generated at each node position on the crack generation plane, displacement changes at all the nodes on the crack generation plane are obtained. Among the displacement changes obtained thus, at least information of the maximum displacement change is stored in the storage unit 50. The order of the positions of the nodes to be set as the crack 4 in the above is predetermined.

In other words, the following relationship is set between each node on the crack generation plane and the boundary conditions. First, a change amount in a constraint direction is set to zero for each node on the crack generation plane for which the constraint condition is set. Accordingly, each node on the crack generation plane for which the constraint condition is set does not move in the constraint direction. Meanwhile, among the nodes on the crack generation plane for which the load condition is set, for each node at which no crack 4 has been generated, a load change amount in a certain direction is set to a value other than zero. In addition, among the nodes on the crack generation plane for which the load condition is set, for each node at which the crack 4 has been generated, load change amounts in all directions are set to zero.

Figure 6:
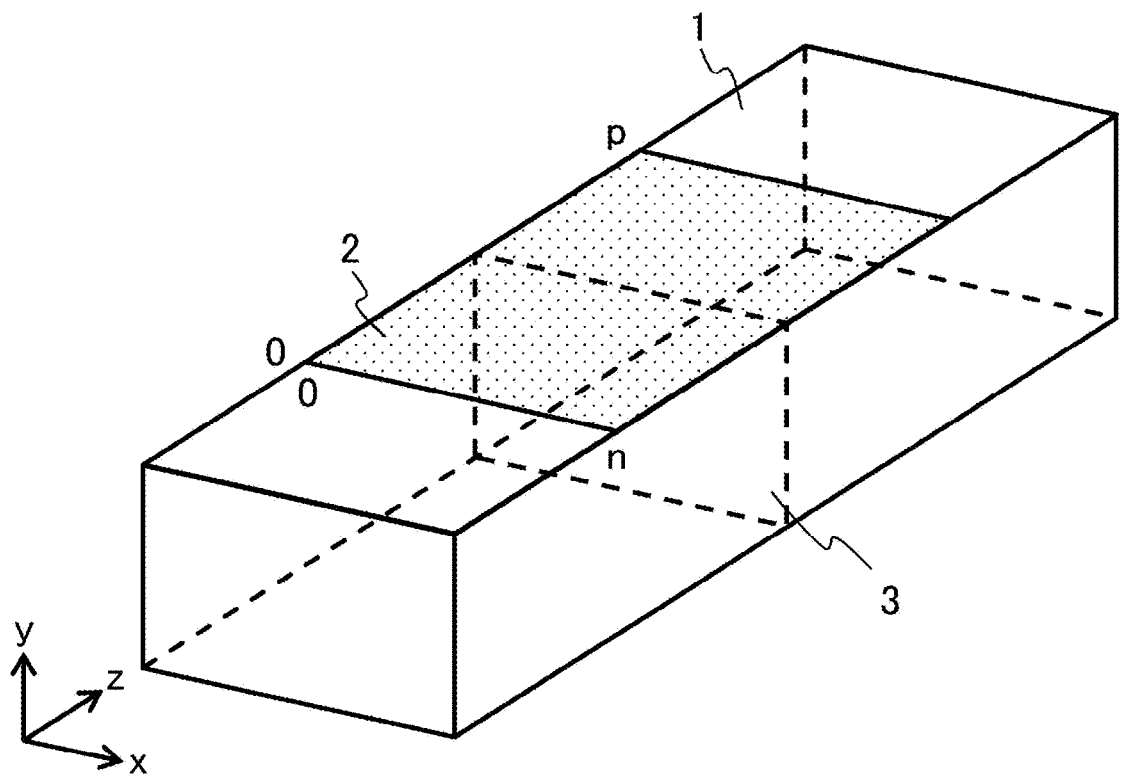
FIG. 6 shows reference coordinates set on an observation plane of the structure in Embodiment 1.
Figure 7:
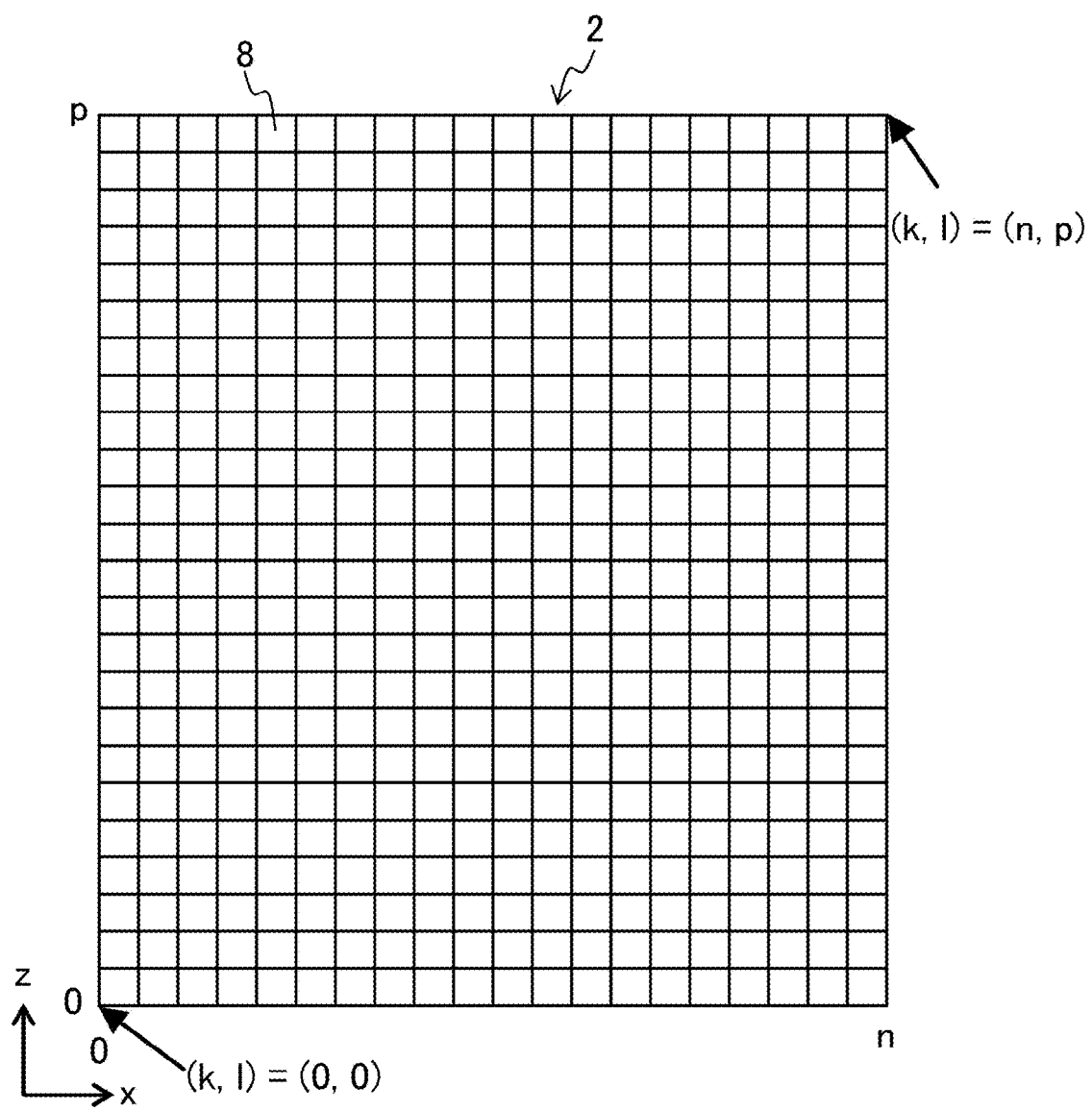
FIG. 7 shows a state where the observation plane is divided into elements in Embodiment 1.

FIG. 6 shows an example of reference coordinates set on the observation plane 2 of the structure 1 in FIG. 2 and FIG. 3. FIG. 7 shows a state where the observation plane 2 in FIG. 6 is divided into elements 8. The observation plane 2 is divided into n elements in the x-axis direction and p elements in a z-axis direction, intersection points in a lattice resulting from the division are indicated as positions (k, l). The positions (k, l) are represented by numbers from (0, 0) to (n, p). When the intersection points in the lattice are defined as nodes, each node is a point located on a line forming the elements 8. Each element 8 is shown as a square in FIG. 7, but is not limited thereto, and may be, for example, a trapezoid.

The structural analysis of the measurement plane is performed for each node position on the crack generation plane. For example, if the crack 4 has been generated at the node at the position (0, 0) on the crack generation plane, the structural analysis is performed for deformation at all the nodes on the measurement plane from the position (0, 0) to the position (n, p) on the measurement plane. In the crack estimation device 100 according to Embodiment 1, a strain change is used as deformation at each node on the measurement plane. Next, for example, if the crack 4 has been generated at the node at the position (0, 1) on the crack generation plane, the structural analysis is performed for strain changes at all the nodes on the measurement plane from the position (0, 0) to the position (n, p) on the measurement plane.

Thereafter, also, for the nodes at the positions other than (0, 0) and (0, 1) on the crack generation plane, the structural analysis is similarly performed for strain changes at all the nodes on the measurement plane. That is, assuming that the crack 4 has been generated at each node position on the crack generation plane, strain changes at all the nodes on the measurement plane are obtained. Among the strain changes obtained thus, at least information of the maximum strain change is stored in the storage unit 50.

In other words, the following relationship is set between each node on the measurement plane and the boundary conditions. First, a change amount in a constraint direction is set to zero for each node on the measurement plane for which the constraint condition is set. Accordingly, each node on the measurement plane for which the constraint condition is set does not move in the constraint direction. Meanwhile, for each node on the measurement plane for which the load condition is set, a load change amount in a certain direction is set to a value other than zero.

As a strain generated when the tensile load 5 on a z axis or the bending moment 6 on a zx plane is applied, a main strain, an equivalent strain defined by the Tresca yield criterion, or an equivalent strain defined by the Von Mises yield criterion may be used.

To summarize the above description, the estimation model generation unit 32 of the model generation unit 30 first performs the structural analysis on the basis of the preset boundary conditions, for the shape model generated by the measurement plane and the crack generation plane in the shape model generation unit 31. Next, the estimation model generation unit 32 generates a plurality of measurement plane estimated change vectors obtained by estimating changes on the measurement plane through the structural analysis, and generates a plurality of crack generation plane estimated change vectors obtained by estimating displacement changes on the crack generation plane as changes on the crack generation plane through the structural analysis. Furthermore, the estimation model generation unit 32 generates an estimation model composed of the generated measurement plane estimated change vectors and the generated crack generation plane estimated change vectors.

Specifically, the estimation model generation unit 32 of the model generation unit 30 gives a boundary condition that no crack 4 is generated, to each node on the crack generation plane in the structural analysis model. Next, the estimation model generation unit 32 calculates a displacement change amount at each node on the crack generation plane in the structural analysis model. Furthermore, the estimation model generation unit 32 calculates a strain at each node as deformation at each node on the measurement plane in the structural analysis model.

Moreover, the estimation model generation unit 32 of the model generation unit 30 gives a boundary condition that each node on the crack generation plane is set as a crack, to each node on the crack generation plane in the structural analysis model. Next, the estimation model generation unit 32 calculates a displacement change amount at each node on the crack generation plane, and a strain at each node as deformation at each node on the measurement plane, in the same manner as described above.

The estimation model generation unit 32 of the model generation unit 30 creates a displacement change vector based on the differences between the displacement change amounts at the nodes on the crack generation plane in the structural analysis model.

Figure 8:
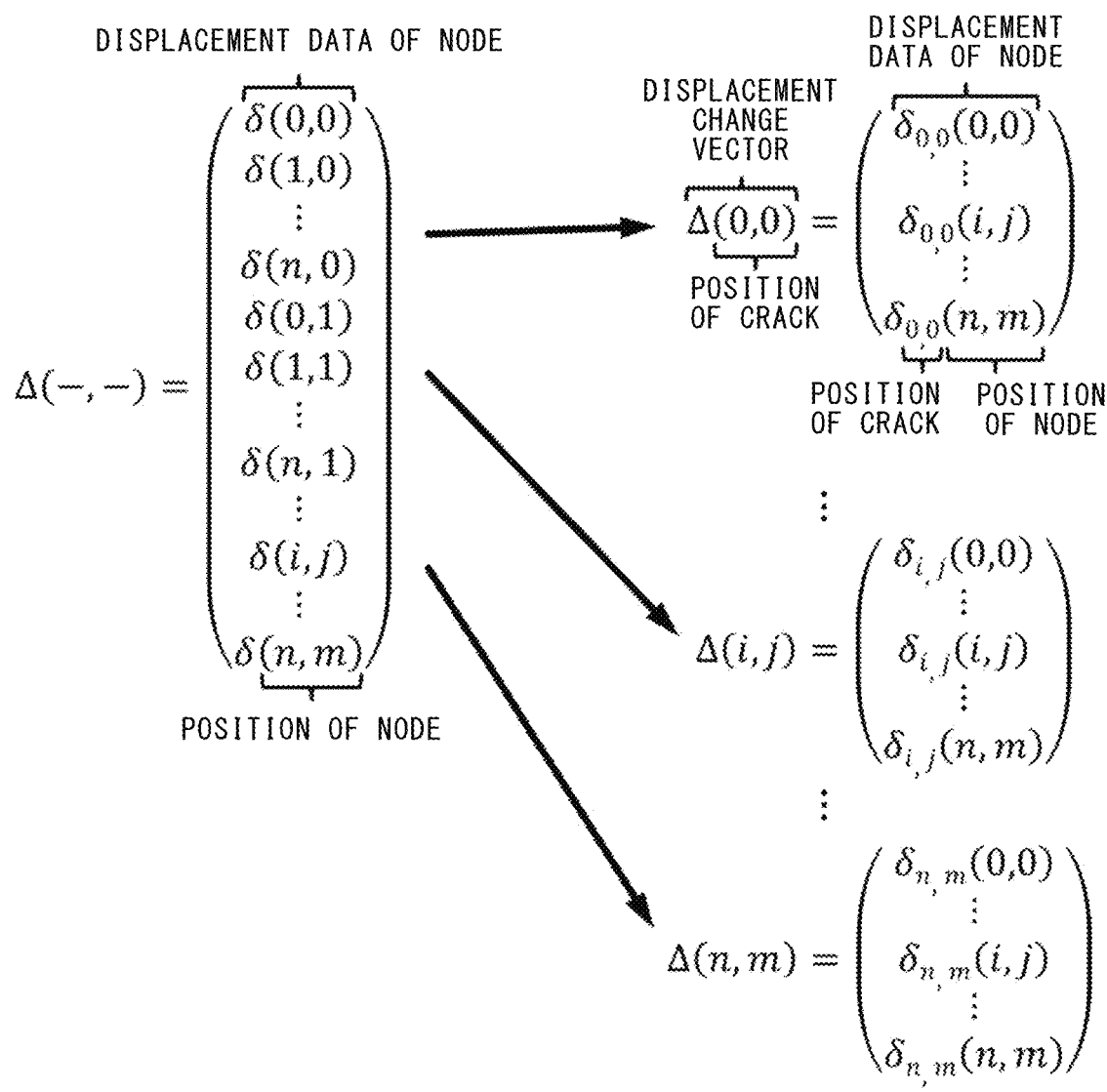
FIG. 8 shows displacement change vectors in the candidate plane in Embodiment 1.

FIG. 8 shows a displacement change vector based on the differences between the displacement change amounts at the respective nodes on the candidate plane 3 at each position of the crack 4 on the candidate plane 3 shown in FIG. 5. As shown in FIG. 8, displacement data of the respective nodes included in a column vector of Δ(-, -) are arranged in the order of moving the crack 4 to be assumed at each node. Here, "-" represents meaningless indefinite data. In the following description as well, "-" represents meaningless indefinite data. δ(i, j) is a displacement change at the node at the position (i, j) on the candidate plane 3 in FIG. 5. Furthermore, for example, $\delta_{0,0}(i, j)$ is displacement data of the node at the position (i, j) when the crack 4 has been generated at the node at the position (0, 0), and Δ(0, 0) is a displacement change vector when the crack 4 has been generated at the node at the position (0, 0).

Expression (1) below shows a crack surface matrix $\Delta_{crack\_diff}$ composed of a plurality of displacement change vectors in FIG. 8. Δ(0, 0) to Δ(n, m) which are the displacement change vectors shown in FIG. 8 are column vectors, and an array of these column vectors in the order of moving the crack 4 to be assumed at each node is $\Delta_{crack\_diff}$ shown in Expression (1).

[Mathematical 1]

$$\Delta_{crack\_diff} = [\Delta(0, 0) \ \ldots \ \Delta(i, j) \ \ldots \ \Delta(n, m)]$$

$$= \begin{bmatrix} \delta_{0,0}(0, 0) & \ldots & \delta_{i,j}(0, 0) & \ldots & \delta_{n,m}(0, 0) \\ \vdots & \ddots & \vdots & \ddots & \vdots \\ \delta_{0,0}(i, j) & \ldots & \delta_{i,j}(i, j) & \ldots & \delta_{n,m}(i, j) \\ \vdots & \ddots & \vdots & \ddots & \vdots \\ \delta_{0,0}(n, m) & \ldots & \delta_{i,j}(n, m) & \ldots & \delta_{n,m}(n, m) \end{bmatrix} \quad (1)$$

Moreover, the estimation model generation unit 32 of the model generation unit 30 creates a strain change vector based on the differences between the strains at the nodes on the measurement plane in the structural analysis model.

Figure 9:
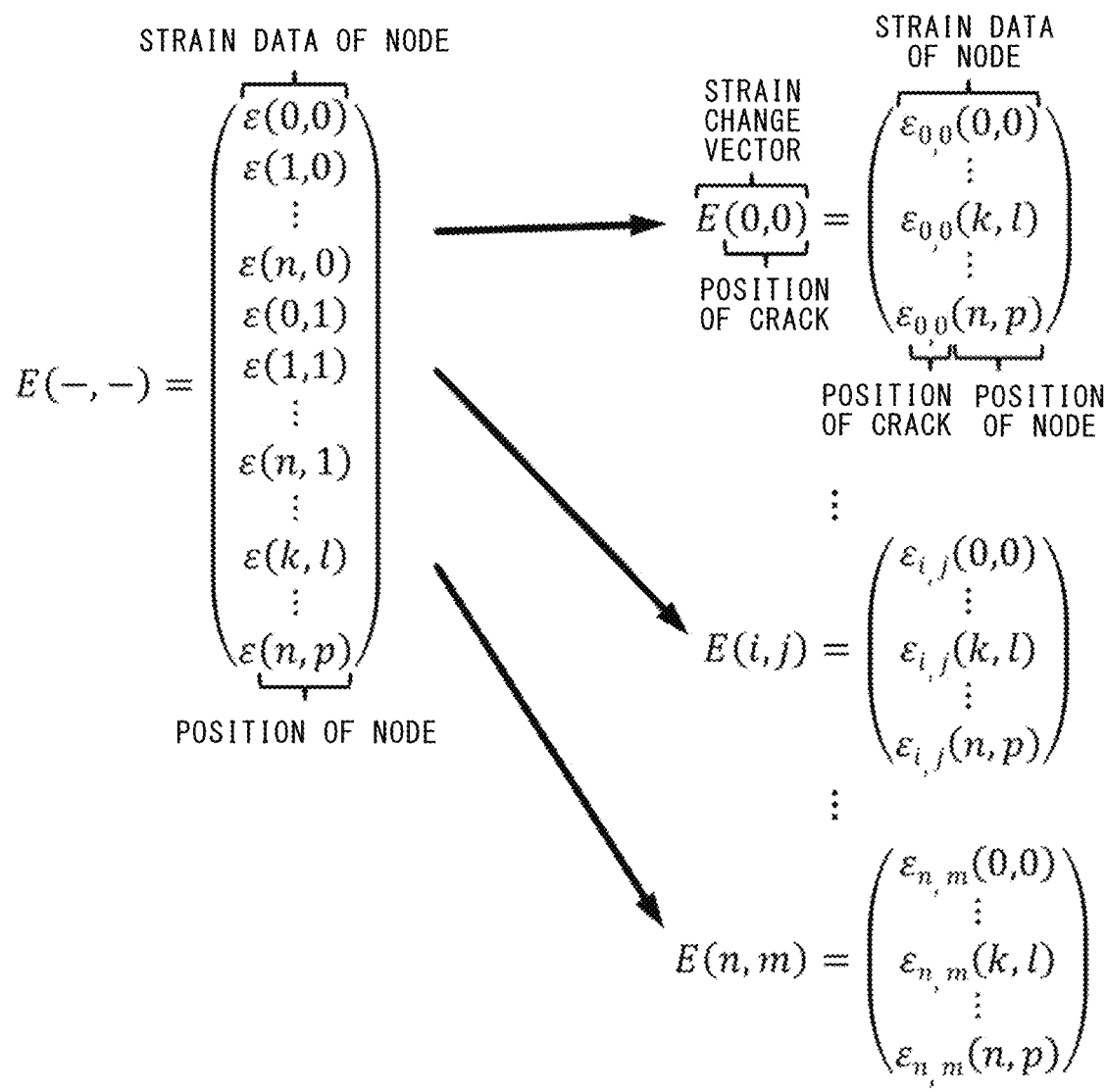
FIG. 9 shows strain change vectors in the observation plane in Embodiment 1.

FIG. 9 shows a strain change vector based on the differences between the strains at the respective nodes on the observation plane 2 shown in FIG. 7 at each position of the crack 4 in the candidate plane 3 shown in FIG. 5. As shown in FIG. 9, strain data of the respective nodes included in a column vector of E(-, -) are arranged in the order of moving the crack 4 to be assumed at each node.

ε(i, j) is strain data of the node at the position (i, j) on the observation plane 2 in FIG. 7. Furthermore, for example, $\varepsilon_{0,0}(k, l)$ is strain data of the node at the position (k, l) on the observation plane 2 when the crack 4 has been generated at the node at the position (0, 0) on the candidate plane 3, and E(0, 0) is a strain change vector when the crack 4 has been generated at the node at the position (0, 0) on the candidate plane 3.

Expression (2) below shows a measurement plane matrix $E_{measure}$ composed of a plurality of strain change vectors in FIG. 9. E(0, 0) to E(n, m) which are the strain change vectors shown in FIG. 9 are column vectors, and an array of these column vectors in the order of moving the crack 4 to be assumed at each node is $E_{measure}$ shown in Expression (2).

[Mathematical 2]

$$E_{measure} = [E(0, 0) \ \ldots \ E(i, j) \ \ldots \ E(n, m)]$$

$$= \begin{bmatrix} \varepsilon_{0,0}(0, 0) & \ldots & \varepsilon_{i,j}(0, 0) & \ldots & \varepsilon_{n,m}(0, 0) \\ \vdots & \ddots & \vdots & \ddots & \vdots \\ \varepsilon_{0,0}(i, j) & \ldots & \varepsilon_{i,j}(k, l) & \ldots & \varepsilon_{n,m}(k, l) \\ \vdots & \ddots & \vdots & \ddots & \vdots \\ \varepsilon_{0,0}(n, m) & \ldots & \varepsilon_{i,j}(n, p) & \ldots & \varepsilon_{n,m}(n, p) \end{bmatrix} \quad (2)$$

Furthermore, the estimation model generation unit 32 of the model generation unit 30 creates a load change vector based on the differences between the load change amounts at the nodes on the crack generation plane in the structural analysis model.

Figure 10:
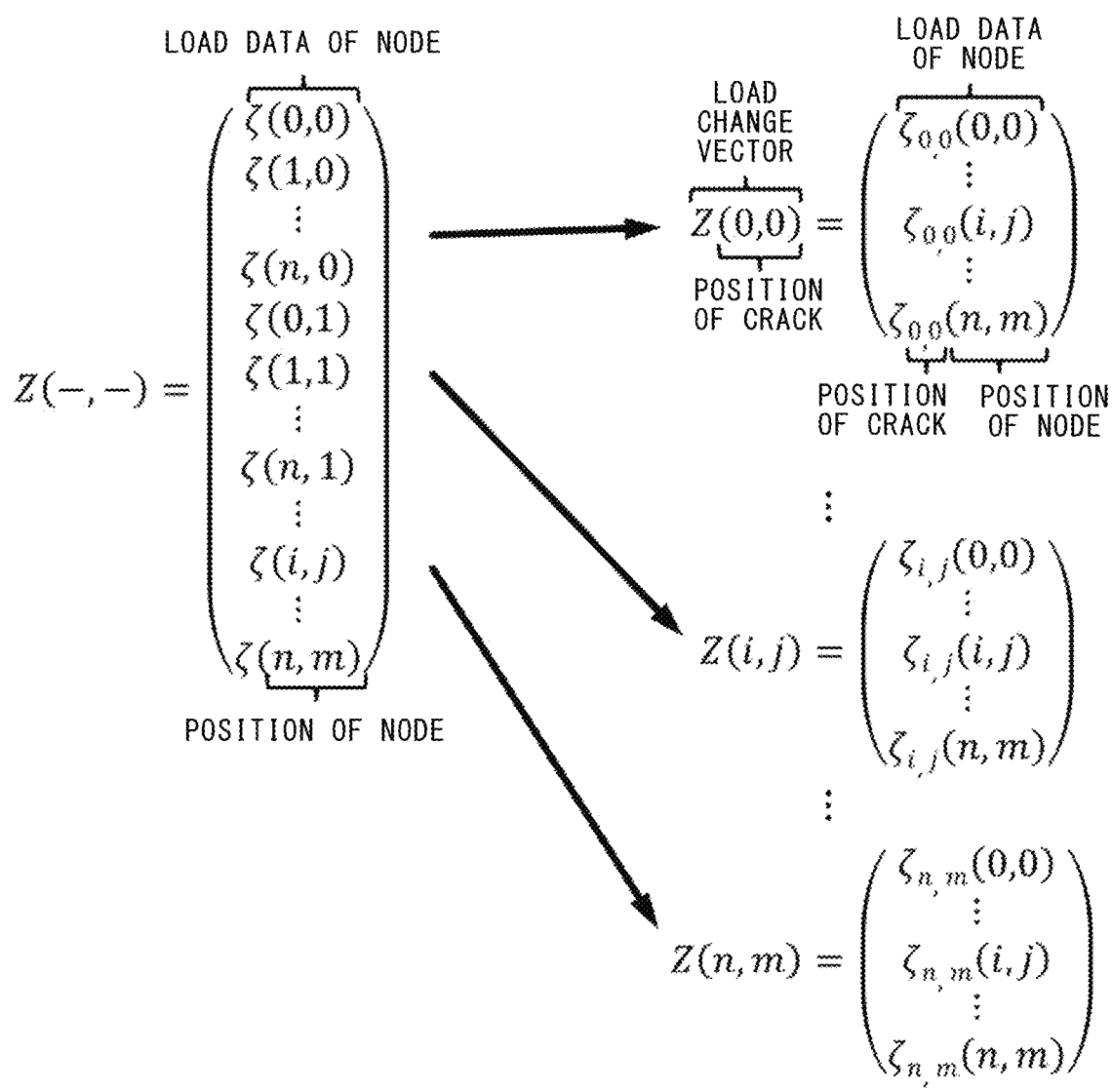
FIG. 10 shows load change vectors in the candidate plane in Embodiment 1.

FIG. 10 shows a load change vector based on the differences between the load change amounts at the respective nodes on the candidate plane 3 at each position of the crack 4 on the candidate plane 3 shown in FIG. 5. As shown in FIG. 10, load data of the respective nodes included in a column vector of Z(-, -) are arranged in the order of moving the crack 4 to be assumed at each node. Furthermore, for example, $\zeta_{0,0}(i, j)$ is load data of the node at the position (i, j) when the crack 4 has been generated at the node at the position (0, 0), and Z(0, 0) is a load change vector when the crack 4 has been generated at the node at the position (0, 0). Specifically, a force at the node at the position at which there is the crack 4 is zero, and a force at the node at each position at which there is no crack 4 is non-zero.

Expression (3) below shows a crack surface load matrix $Z_{crack\_diff}$ composed of a plurality of load change vectors in FIG. 10. Z(0, 0) to Z(n, m) which are the load change vectors shown in FIG. 10 are column vectors, and an array of these column vectors in the order of moving the crack 4 to be assumed at each node is $Z_{crack\_diff}$ shown in Expression (3).

[Mathematical 3]

$$Z_{crack\_diff} = [Z(0, 0) \ \ldots \ Z(i, j) \ \ldots \ Z(n, m)]$$

$$= \begin{bmatrix} \zeta_{0,0}(0, 0) & \ldots & \zeta_{i,j}(0, 0) & \ldots & \zeta_{n,m}(0, 0) \\ \vdots & \ddots & \vdots & \ddots & \vdots \\ \zeta_{0,0}(i, j) & \ldots & \zeta_{i,j}(i, j) & \ldots & \zeta_{n,m}(i, j) \\ \vdots & \ddots & \vdots & \ddots & \vdots \\ \zeta_{0,0}(n, m) & \ldots & \zeta_{i,j}(n, m) & \ldots & \zeta_{n,m}(n, m) \end{bmatrix} \quad (3)$$

The relationship between $\Delta_{crack\_diff}$, $E_{measure}$, and $Z_{crack\_diff}$ which are obtained so far is represented by Expression (4) and Expression (5) below.

[Mathematical 4]

$$E_{measure} = H\Delta_{crack\_diff} \quad (4)$$

[Mathematical 5]

$$Z_{crack\_diff} = G\Delta_{crack\_diff} + Z_{no\_crack} \quad (5)$$

In Expression (4) and Expression (5), H is an observation matrix, and G is a stiffness matrix. $Z_{no\_crack}$ is a vector which is obtained by the estimation model generation unit 32 of the model generation unit 30 and indicates the load at each node on the candidate plane 3 under the boundary condition that no crack 4 is generated. Expression (4) and Expression (5) are transformed to obtain the observation matrix H and the stiffness matrix G by Expression (6) and Expression (7) below.

[Mathematical 6]

$$H = E_{measure} \Delta_{crack\_diff}^{-} \quad (6)$$

[Mathematical 7]

$$G = (Z_{crack\_diff} - Z_{no\_crack}) \Delta_{crack\_diff}^{-1} \quad (7)$$

Here, the elements of the stiffness matrix G are those shown in Expression (8).

[Mathematical 8]

$$G = \begin{bmatrix} g_{0,0}(0,0) & \cdots & \cdots & \cdots & \cdots & g_{n,m}(0,0) \\ g_{0,0}(1,0) & \ddots & & & & \vdots \\ \vdots & & \ddots & & & \vdots \\ g_{0,0}(i,j) & & & \ddots & & \vdots \\ \vdots & & & & \ddots & \vdots \\ g_{0,0}(n,m) & \cdots & \cdots & \cdots & \cdots & g_{n,m}(n,m) \end{bmatrix} \quad (8)$$

Figure 11:
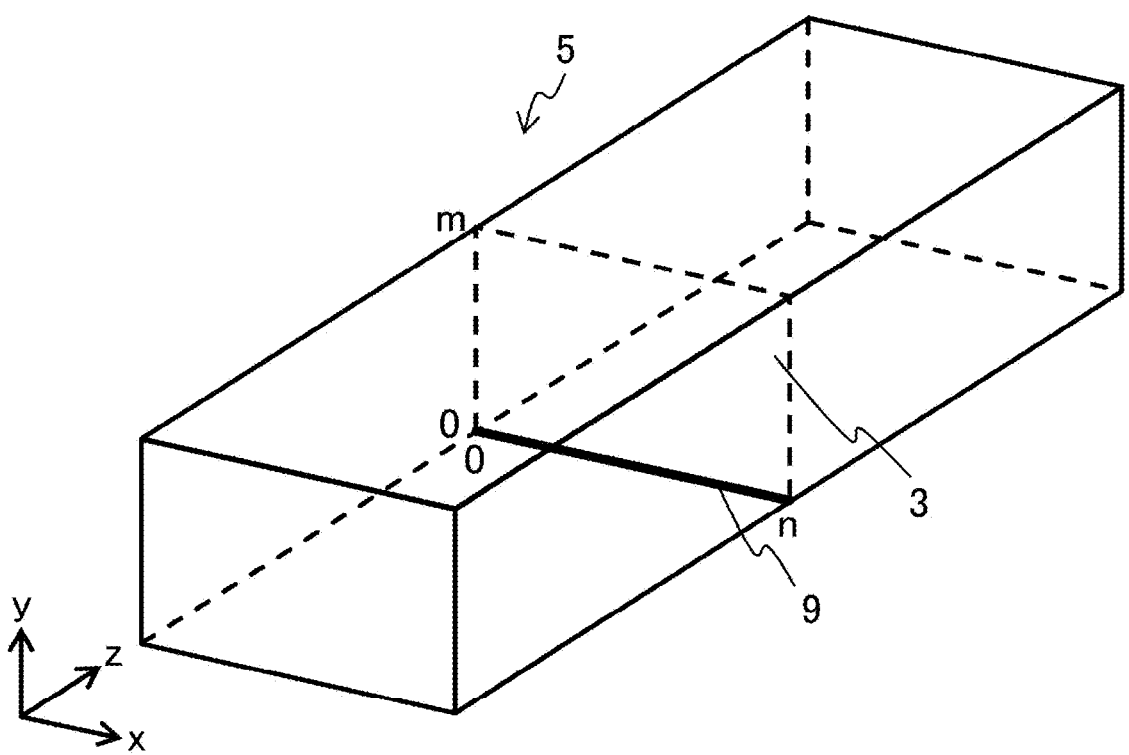
FIG. 11 shows an example of a side of the candidate plane on which a start point of crack progression is set in Embodiment 1.
Figure 12:
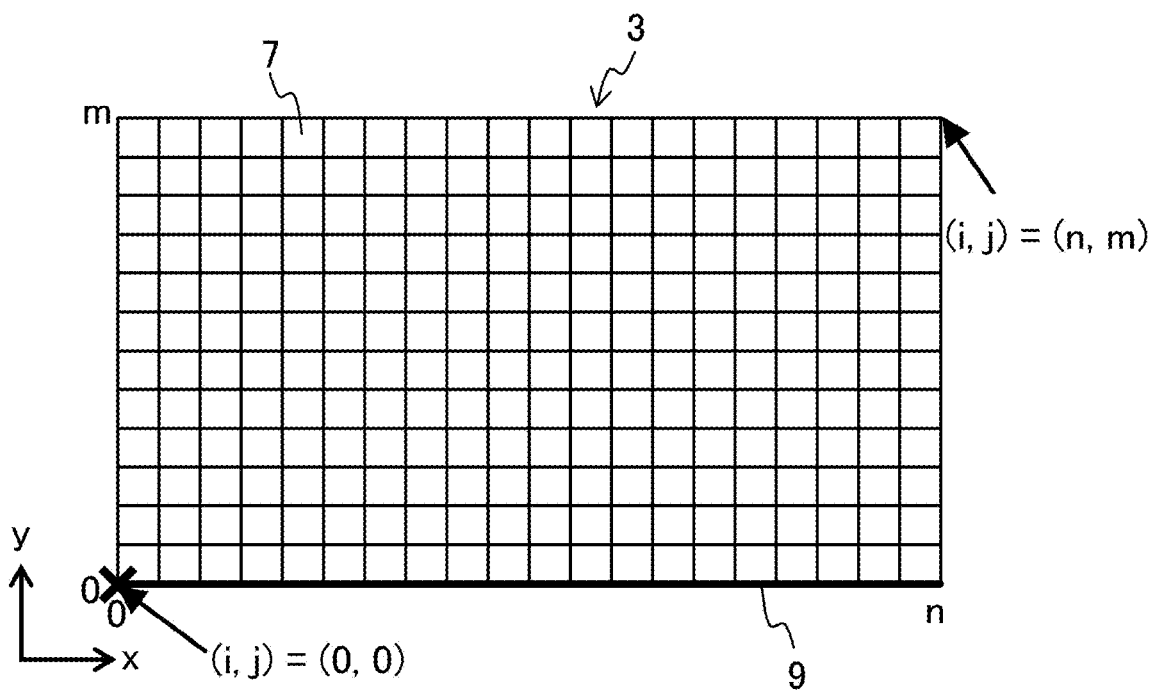
FIG. 12 shows a first example of a node identified as a crack on the candidate plane on which the start point of crack progression is set in Embodiment 1.

Using the relationships obtained so far, calculation simulating crack progression on the crack generation plane is performed to obtain a crack shape to be used as learning data. FIG. 11 shows an example of a side 9 of the crack generation plane on which a start point of crack progression is to be set. FIG. 12 shows a first example of a node identified as the crack 4 in the crack generation plane on which the start point of crack progression is set. In FIG. 12, the node at the position (0, 0) on the side 9 is identified as the crack 4. Accordingly, the crack 4 is set at the position (0, 0).

Figure 13:
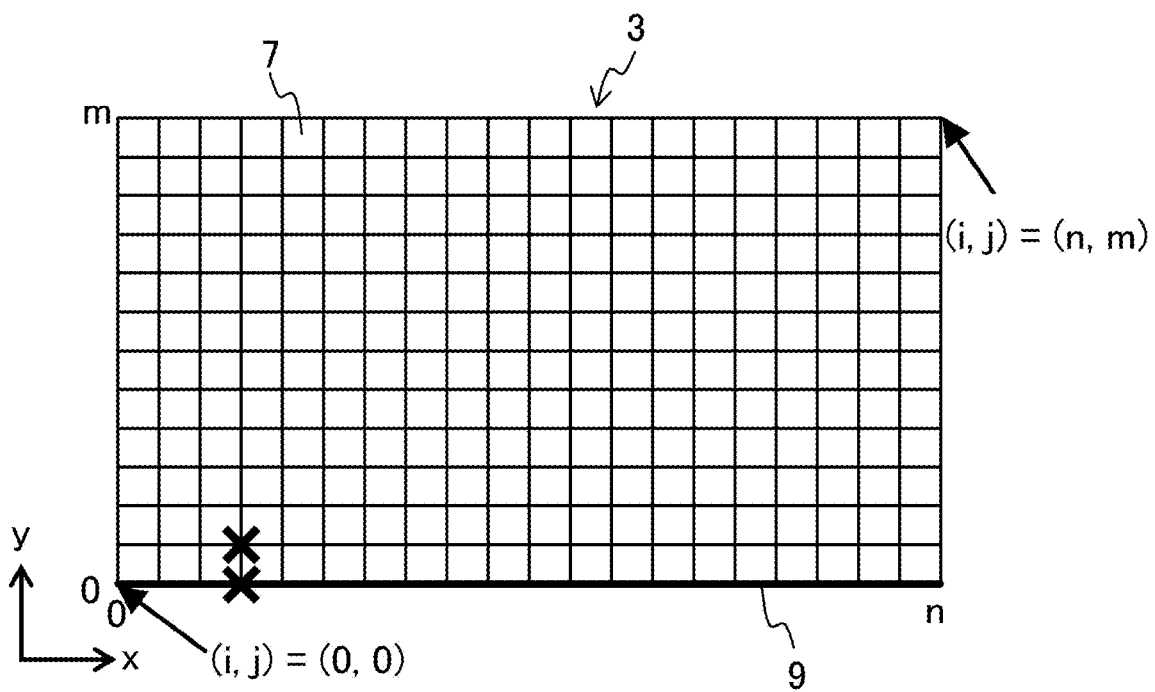
FIG. 13 shows a second example of the node identified as a crack on the candidate plane on which the start point of crack progression is set in Embodiment 1.

FIG. 13 shows a second example of the node identified as the crack 4 in the crack generation plane on which the start point of crack progression is set. In FIG. 13, the node at the position (3, 1) is identified as the crack 4. In this case, as for the crack 4, the node at (3, 1) at which the value of the load data in the load change vector in the crack generation plane when there is the crack 4 at (3, 0) on the side 9 is the maximum is set as a new crack 4. A method for setting the new crack 4 may be, for example, a method in which an element to which the crack 4 is expanded is determined by morphological operation. By these operations, the crack 4 is set at (3, 1) and (3, 0). Learning data is calculated by performing the structural analysis under such boundary conditions.

Here, the learning data includes latent variable vectors Γ indicating whether or not the nodes on the crack generation plane are the crack 4, the displacement change vectors Δ based on the differences between the displacement change amounts at the nodes on the crack generation plane, the load change vectors Z based on the differences between the load change amounts at the nodes on the crack generation plane, and the strain change vectors E based on the differences between the strains on the measurement plane. Here, each latent variable vector Γ indicates the position and the size of a crack candidate on the crack generation plane. The latent variable vectors Γ, the displacement change vectors Δ, and the load change vectors Z are each a vector composed of state quantities indicating the states of the respective nodes on the crack generation plane for each crack candidate, and each strain change vector E is a vector composed of state quantities indicating the states of the respective nodes on the measurement plane for each crack candidate. Here, a point on the side 9 of the crack generation plane for which calculation has been performed by the estimation model generation unit 32 as shown in FIG. 12 is set as a start point. That is, (i, j)=(i, 0) is set as a start point of the crack 4. In this case, a latent variable vector $\Gamma^{(0)}_{(i,0)}$ is $\Gamma_{(i,0)}$, a displacement change vector $\Delta^{(0)}_{(i,0)}$ is $\Delta_{(i,0)}$, a strain change vector $E^{(0)}_{(i,0)}$ is $E_{(i,0)}$, and a load change vector $Z^{(0)}_{(i,0)}$ is $Z_{(i,0)}$.

Next, the node at which the load change vector $Z^{(0)}_{(i,0)}$ is the maximum is set as the next crack 4 that is a new crack candidate. Here, (i, j)=(i, 1) is set as the next crack 4. When the second crack candidate is set, a latent variable vector $\Gamma^{(1)}_{(i,0)}$ is as in Expression (9), and a displacement change vector $\Delta^{(1)}_{(i,0)}$ is as in Expression (10).

[Mathematical 9]

$$\Gamma^{(1)}_{(i,0)} = \begin{pmatrix} \gamma_{i,0}(0,0) \\ \vdots \\ \gamma_{i,0}(i-1,0) \\ \gamma_{i,0}(i,0) \\ \gamma_{i,0}(i+1,0) \\ \vdots \\ \gamma_{i,0}(i-1,1) \\ \gamma_{i,0}(i,1) \\ \gamma_{i,0}(i+1,1) \\ \vdots \\ \gamma_{i,0}(n,m) \end{pmatrix} = \begin{pmatrix} 0 \\ \vdots \\ 0 \\ 1 \\ 0 \\ \vdots \\ 0 \\ 1 \\ 0 \\ \vdots \\ 0 \end{pmatrix} \quad (9)$$

[Mathematical 10]

$$\Delta^{(1)}_{(i,0)} = \begin{pmatrix} \delta_{i,0}(0,0) \\ \vdots \\ \delta_{i,0}(i-1,0) \\ \delta_{i,0}(i,0) \\ \delta_{i,0}(i+1,0) \\ \vdots \\ \delta_{i,0}(i-1,1) \\ \delta_{i,0}(i,1) \\ \delta_{i,0}(i+1,1) \\ \vdots \\ \delta_{i,0}(n,m) \end{pmatrix} = \begin{pmatrix} 0 \\ \vdots \\ 0 \\ \delta_{i,0}(i,0) \\ 0 \\ \vdots \\ 0 \\ \delta_{i,0}(i,1) \\ 0 \\ \vdots \\ 0 \end{pmatrix} \quad (10)$$

The displacement change vector $\Delta^{(1)}_{(i,0)}$ shown in Expression (10) has a relationship with a load change vector $Z^{(1)}_{(i,0)}$ as shown in Expression (11).

[Mathematical 11]

$$Z_{(i,0)}^{(1)} = G\Delta_{(i,0)}^{(1)} + Z_{no\_crack} \quad (11)$$

At the node for which a latent variable $\gamma_{(i,0)}(i, j)$ in the latent variable vector $\Gamma^{(1)}_{(i,0)}$ is 1, that is, the node at which the crack 4 is set, a load $\zeta_{(i,0)}(i, j)$ is zero, and a displacement $\delta_{(i,0)}(i, j)$ is not zero, so that a load change vector obtained by extracting only these data from Expression (11) is represented as $Z^{(1)'}_{(i,0)}$ as in Expression (12).

[Mathematical 12]

$$Z_{(i,0)}^{(1)'} = G_{(i,0)}^{(1)'} \Delta_{(i,0)}^{(1)'} + Z'_{no\_crack} \quad (12)$$

In Expression (12), only the data in which the load $\zeta_{(i,0)}(i, j)$ is zero is extracted, so that Expression (12) becomes Expression (13).

[Mathematical 13]

$$0 = G_{(i,0)}^{(1)'} \Delta_{(i,0)}^{(1)'} + Z'_{no\_crack} \quad (13)$$

From Expression (13), a displacement change vector $\Delta^{(1)'}_{(i,0)}$ can be obtained as in Expression (14).

[Mathematical 14]

$$\Delta_{(i,0)}^{(1)'} = [G_{(i,0)}^{(1)'}]^{-1}(-Z'_{no\_crack}) \quad (14)$$

The displacement change vector $\Delta^{(1)}_{(i,0)}$ is obtained by adding information of the displacement $\delta_{(i,0)}(i, j)$ at each node at which the crack 4 is not set, to the displacement change vector $\Delta^{(1)'}_{(i,0)}$ obtained by Expression (14), and a strain change vector $E^{(1)}_{(i,0)}$ and the load change vector $Z^{(1)}_{(i,0)}$ are obtained by Expression (15) and Expression (16) using the observation matrix H and the stiffness matrix G.

[Mathematical 15]

$$E_{(i,0)}^{(1)} = H\Delta_{(i,0)}^{(1)} \qquad (15)$$

[Mathematical 16]

$$Z_{(i,0)}^{(1)} = G\Delta_{(i,0)}^{(1)} + Z_{no\_crack} \qquad (16)$$

The latent variable vector $\Gamma^{(1)}_{(i,0)}$, the displacement change vector $\Delta^{(1)}_{(i,0)}$ based on the differences between the displacement changes at the nodes on the crack generation plane, the load change vector $Z^{(1)}_{(i,0)}$ based on the differences between the load change amounts at the nodes on the crack generation plane, and the strain change vector $E^{(1)}_{(i,0)}$ based on the differences between the strains at the nodes on the measurement plane, which are obtained as described above, are made into a set for each crack candidate, and stored as learning data.

Next, the node at which the load change vector $Z^{(1)}_{(i,0)}$ is the maximum is set as the next crack 4, a latent variable vector $\Gamma^{(2)}_{(i,0)}$ and a displacement change vector $\Delta^{(2)}_{(i,0)}$ are set, and a process corresponding to Expression (9) to Expression (16) is performed. This process corresponding to Expression (9) to Expression (16) is performed q times in total. In addition, for the next start point on the side 9 of the crack generation plane, the process corresponding to Expression (9) to Expression (16) is performed q times in total, and this process is performed q times for all the nodes on the side 9 of the crack generation plane, whereby learning data is obtained from all start points. Accordingly, learning data of $(n+1)*(q+1)$ is obtained as the number of cases where crack progression is carried out q times from $(n+1)$ nodes. FIG. 14 shows learning data created by the estimation model generation unit 32. In FIG. 14, the number of columns is $(n+1)*(q+1)$, and s represents a number that is not less than 0 and not greater than q. As described above, a crack candidate is set by setting a plurality of start points in advance and carrying out crack progression on the basis of a predetermined condition from each set start point, whereby the number of crack candidates is limited. Therefore, learning data can be created with a limited amount of processing.

Here, the learning data in the estimation model generation unit 32 is obtained by the structural analysis, but learning data may be created by creating a structure including the shapes of a plurality of cracks 4 and actually measuring surface strain changes at that time.

Next, the operation of the measurement unit 10 will be described. The measurement unit 10 measures surface strain changes on the observation plane 2 in the structure 1, for each of the case of a condition that there is no crack 4 inside the flat plate which is the structure 1 and the case of a condition that the crack 4 is generated inside the flat plate which is the structure 1. An array of the measured strain changes as a column vector in the same order as the order of moving the crack 4 to be assumed at each node is shown in Expression (17).

[Mathematical 17]

$$\tilde{\varepsilon} = \begin{bmatrix} \tilde{d\varepsilon}_{0*0} \\ \vdots \\ \tilde{d\varepsilon}_{n*p} \end{bmatrix} \qquad (17)$$

The measurement unit 10 measures the column vector as shown in Expression (17), as a measurement plane deformation vector. In the measurement plane deformation vector, a suffix "0*0" indicates the node (0, 0) on the observation plane 2 in FIG. 7. The measurement plane deformation vector measured thus is outputted to the data acquisition unit 41 of a crack state analysis unit 40.

Next, the operation of the crack state analysis unit 40 will be described. The crack state analysis unit 40 includes the data acquisition unit 41 and the crack state estimation unit 42. The data acquisition unit 41 acquires the measurement plane deformation vector outputted from the measurement unit 10, and outputs the measurement plane deformation vector to a vector similarity calculation unit 43 of the crack state estimation unit 42.

Next, the operation of the crack state estimation unit 42 will be described. The crack state estimation unit 42 includes the vector similarity calculation unit 43 and the crack analysis unit 44. The vector similarity calculation unit 43 receives a strain change vector $E^{(s)}_{(i,0)}$ based on the differences between the strains at the nodes on the measurement plane in the learning data shown in FIG. 14, from the estimation model generation unit 32, and uses the strain change vector $E^{(s)}_{(i,0)}$ as a measurement plane estimated change vector.

In order to obtain the similarity between the measurement plane deformation vector shown in Expression (17) and the measurement plane estimated change vector, the vector similarity calculation unit 43 obtains a Euclidean distance which is an L2 norm as shown in Expression (18). By using the Euclidean distance as the similarity, an accurate similarity can be obtained with a limited amount of processing.

[Mathematical 18]

$$\alpha_{(i,0)}^{(s)} = \|\tilde{\varepsilon} - E_{(i,0)}^{(s)}\| \qquad (18)$$

Here, assuming that a variance of a Euclidean distance $\alpha^{(s)}_{(i,0)}$ obtained in Expression (18) is the same as a variance $\sigma^2$ of the measurement plane deformation vector shown in Expression (17), a likelihood function shown in Expression (19) is obtained by assuming a normal distribution from the Euclidean distance $\alpha^{(s)}_{(i,0)}$ obtained in Expression (18) and the variance $\sigma^2$ of the measurement plane deformation vector.

[Mathematical 19]

$$L(\beta) = (2\pi\sigma^2)^{-\frac{1}{2}} \exp\left(-\frac{[\alpha_{i,0}^{(s)}]^2}{2\sigma^2}\right) \qquad (19)$$

Here, $\beta$ takes values from 1 to $(n+1)*(q+1)$, corresponds to the value of (i, s), and represents the case of the learning data. For example, $\beta=1$ represents (i, s)=(0, 0), and $\beta=(n+1)*(q+1)$ represents (i, s)=(n, q).

In order to normalize the likelihood function shown in Expression (19), a value C which is the sum of the values of the likelihood function is obtained as shown in Expression (20).

[Mathematical 20]

$$C = \sum_{\beta=1}^{(n+1)*(q+1)} (2\pi\sigma^2)^{-\frac{1}{2}} \exp\left(-\frac{[\alpha_{i,0}^{(s)}]^2}{2\sigma^2}\right) \quad (20)$$

The likelihood function obtained in Expression (19) and normalized by C shown in Expression (20) is shown in Expression (21).

[Mathematical 21]

$$\overline{L}(\beta) = \frac{1}{C} L(\beta) \quad (21)$$

The normalized likelihood function shown in Expression (21) is equal to the likelihood function of the latent variable indicating the presence/absence of the crack 4. The vector similarity calculation unit 43 receives a latent variable vector $\Gamma^{(s)}_{(i,0)}$ in the learning data shown in FIG. 14, from the estimation model generation unit 32, multiplies the likelihood function shown in Expression (21) by the corresponding latent variable vector $\Gamma^{(s)}_{(i,0)}$, and adds together the results of the multiplication for all the crack candidates, thereby obtaining an expected value of the latent variable in the likelihood function. The vector similarity calculation unit 43 outputs the value shown in Expression (22), to the crack analysis unit 44.

[Mathematical 22]

$$\overline{\Gamma} = \sum_{\beta=1}^{(n+1)\times(q+1)} \overline{L}(\beta) \cdot \Gamma^{(s)}_{(i,0)} \quad (22)$$

The crack analysis unit 44 obtains the position and the size of the crack 4 to be estimated in the crack generation plane, by thresholding the expected value of the latent variable obtained in Expression (22), with a predetermined threshold value. The obtained results are outputted from the crack analysis unit 44 to an output processing unit 61 of the analysis result output unit 60.

In Expression (22), the expected value of the latent variable in the likelihood function is obtained by multiplying the likelihood function shown in Expression (21) by the corresponding latent variable vector $\Gamma^{(s)}_{(i,0)}$ and adding together the results of the multiplication for all the crack candidates. However, an expected value may be obtained using a displacement change vector $\Delta^{(s)}_{(i,0)}$, which is a vector composed of state quantities indicating the states of the respective nodes on the crack generation plane, in the same manner as for the latent variable vector $\Gamma^{(s)}_{(i,0)}$. The normalized likelihood function shown in Expression (21) is equal to the likelihood function of the displacement change at each node on the candidate plane 3. An expected value of the displacement change in the likelihood function may be obtained by multiplying the likelihood function shown in Expression (21) by the corresponding displacement change vector $\Delta^{(s)}_{(i,0)}$, and adding together the results of the multiplication for all the crack candidates, and the position and the size of the crack 4 to be estimated in the crack generation plane may be obtained by thresholding the obtained expected value with a predetermined threshold value.

Furthermore, an expected value may be obtained using a load change vector $Z^{(s)}_{(i,0)}$, which is a vector composed of state quantities indicating the states of the respective nodes on the crack generation plane, in the same manner as for the latent variable vector $\Gamma^{(s)}_{(i,0)}$. The normalized likelihood function shown in Expression (21) is equal to the likelihood function of the load change at each node on the candidate plane 3. An expected value of the load change in the likelihood function may be obtained by multiplying the likelihood function shown in Expression (21) by the corresponding load change vector $Z^{(s)}_{(i,0)}$, and adding together the results of the multiplication for all the crack candidates, and the position and the size of the crack 4 to be estimated in the crack generation plane may be obtained by thresholding the obtained expected value with a predetermined threshold value. Even when the vector quantities used for the estimation so far are handled as a two-dimensional array or image data, it is possible to realize the crack estimation device according to the present disclosure.

Information of the position and the size of the estimated crack 4 is outputted from the crack analysis unit 44 to the output processing unit 61 of the analysis result output unit 60. The output processing unit 61 acquires the information of the position and the size of the estimated crack 4 from the crack analysis unit 44, and acquires information of the load applied to the structure 1, a physical property value of the structure 1, information of the size of the crack 4 that makes the structure 1 unusable, and information of the position of the crack 4 that makes the structure 1 unusable, from the storage unit 50. The information of the load applied to the structure 1 may be acquired from the model generation unit 30 via the crack state analysis unit 40. Here, the physical property value is, for example, a modulus of longitudinal elasticity. The information of the size of the crack 4 that makes the structure 1 unusable, and the information of the position of the crack 4 that makes the structure 1 unusable are used as limit values. In addition, the physical property value of the structure 1, the information of the size of the crack 4 that makes the structure 1 unusable, and the information of the position of the crack 4 that makes the structure 1 unusable, all of which are stored in the storage unit 50, are information that is determined and stored at the stage of production design. The output processing unit 61 calculates the remaining use period of the structure 1 on the basis of these acquired pieces of information. The remaining use period may be calculated from changes in the size and the position of the crack 4 over time. The calculated remaining use period is displayed on a display device 63. The display device 63 is realized by, for example, a liquid crystal display or the like. Since the remaining use period of the structure 1 can be confirmed by the display device 63, a more specific operation plan for the structure 1 can be made. For example, the time when the structure 1 should be repaired and the time when the structure 1 should be renewed are clarified in advance, so that repair and renewal of the structure 1 can be performed as planned.

If the position of the estimated crack 4 exceeds the limit value of the position of the crack 4 that makes the structure 1 unusable, or if the size of the estimated crack 4 exceeds the limit value of the size of the crack 4 that makes the structure 1 unusable, the output processing unit 61 transmits information of an alarm for promoting stop of the use of the structure, to an alarm device 62 or the display device 63, and the alarm device 62 or the display device 63 issues an alarm. The alarm is issued by, for example, sound, text, flashing, lighting, etc., the alarm device 62 is realized by a speaker, a light emitting device, or the like, and the display device 63 is realized by a liquid crystal display or the like. For example, if the alarm device 62 is a speaker, it is possible to issue an alarm by sound, and if the alarm device 62 is a light emitting device, it is possible to issue an alarm by flashing and lighting. In the case where an alarm is issued by the display of the display device 63, it is possible to issue an alarm by text. The operator of the structure 1 can be quickly notified to stop the use of the structure 1, by issuing the alarm from the alarm device 62 or the display device 63.

Figure 15:
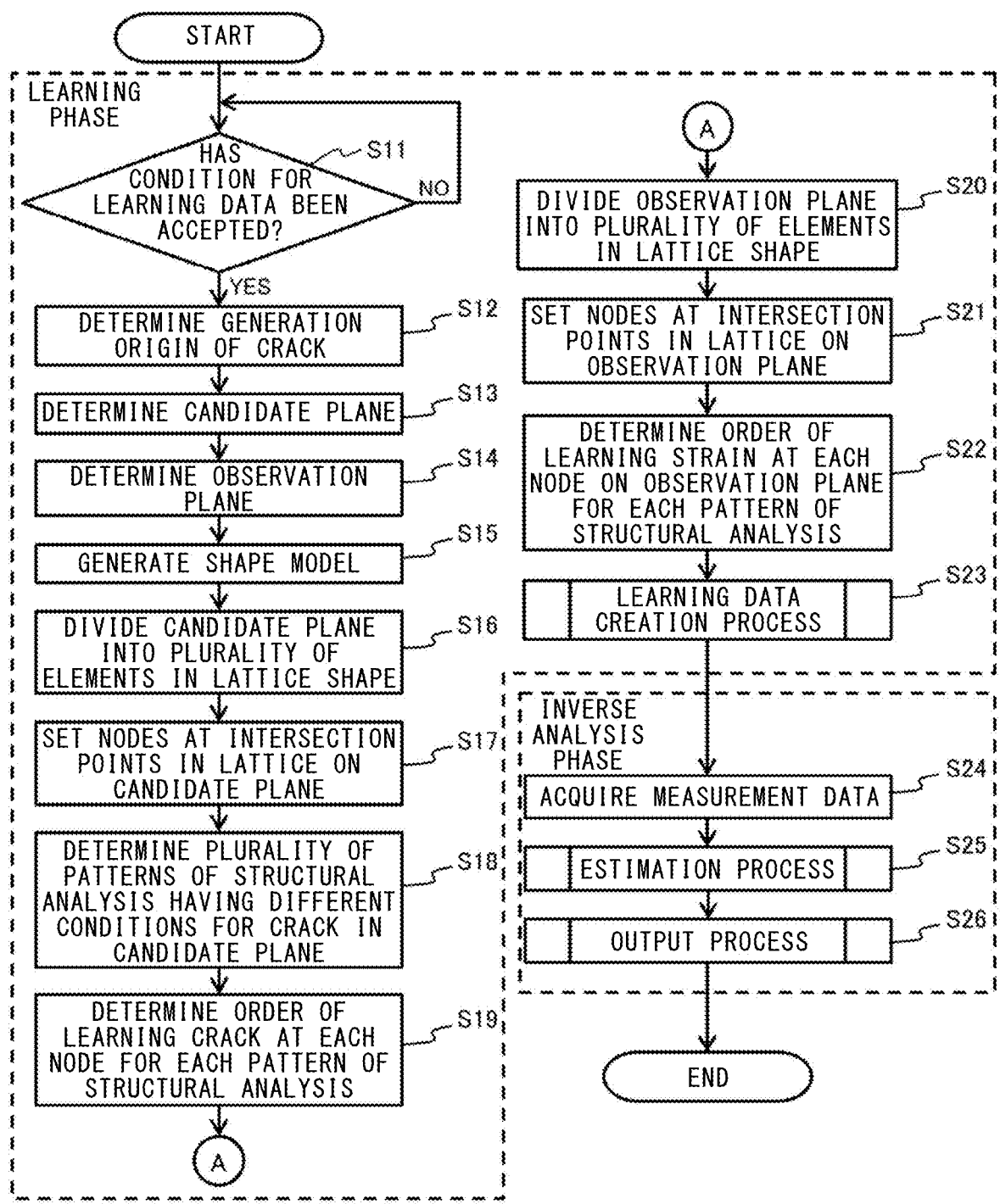
FIG. 15 is a flowchart showing the operation of the crack estimation device in Embodiment 1.

Next, the operation of the crack estimation device 100 will be described with reference to flowcharts. FIG. 15 is a flowchart illustrating the processes executed by the crack estimation device 100. Step S11 to step S23 are processes executed in the learning phase, and step S24 to step S26 are processes executed in the inverse analysis phase. Step S11 to step S22 are executed by the shape model generation unit 31 of the estimation unit 20, and step S23 is executed in the estimation model generation unit 32 of the estimation unit 20. Step S11 to step S23 are a model generation step. Step S24 is executed in the measurement unit 10 and the data acquisition unit 41. Step S24 is a data acquisition step. Step S25 is executed in the crack state estimation unit 42 of the estimation unit 20. Step S25 is a crack state estimation step. Step S26 is executed in the analysis result output unit 60 of the estimation unit 20. Step S26 is an analysis result output step.

In step S11, it is determined whether or not a condition for learning data has been accepted. If it is determined that the condition for learning data has not been accepted, the process in step S11 is repeated. The condition for learning data includes a generation origin of the crack 4 to be estimated, and the shape of the crack 4. If it is determined in step S11 that the condition for learning data has been accepted, the process proceeds to step S12.

In step S12, the generation origin of the crack 4 is determined form the accepted condition for learning data, and the process proceeds to step S13. In step S13, the candidate plane 3 is determined on the basis of the generation origin of the crack 4, and the process proceeds to step S14. In step S14, the observation plane 2 to be measured by the measurement unit 10 is determined, and the process proceeds to step S15. In step S15, a shape model is generated from the shape of the structure 1. Next, the process proceeds to step S16.

In step S16, the candidate plane 3 is divided into a plurality of elements 7 in a lattice shape, and the process proceeds to step S17. In step S17, nodes are set at intersection points in a lattice obtained when the candidate plane 3 is divided into the plurality of elements 7 in step S16, and the process proceeds to step S18. In step S18, a plurality of patterns of structural analysis having different conditions for the crack 4 in the candidate plane 3 are determined, and the process proceeds to step S19. In step S19, the order of learning a crack at each node is determined for each pattern of structural analysis determined in step S18, and the process proceeds to step S20.

In step S20, the observation plane 2 is divided into a plurality of elements 8 in a lattice shape, and the process proceeds to step S21. In step S21, nodes are set at intersection points in a lattice obtained when the observation plane 2 is divided into the plurality of elements 8 in step S20, and the process proceeds to step S22. In step S22, the order of learning a strain at each node on the observation plane 2 is determined for each pattern of structural analysis determined in step S18, and the process proceeds to step S23.

Figure 16:
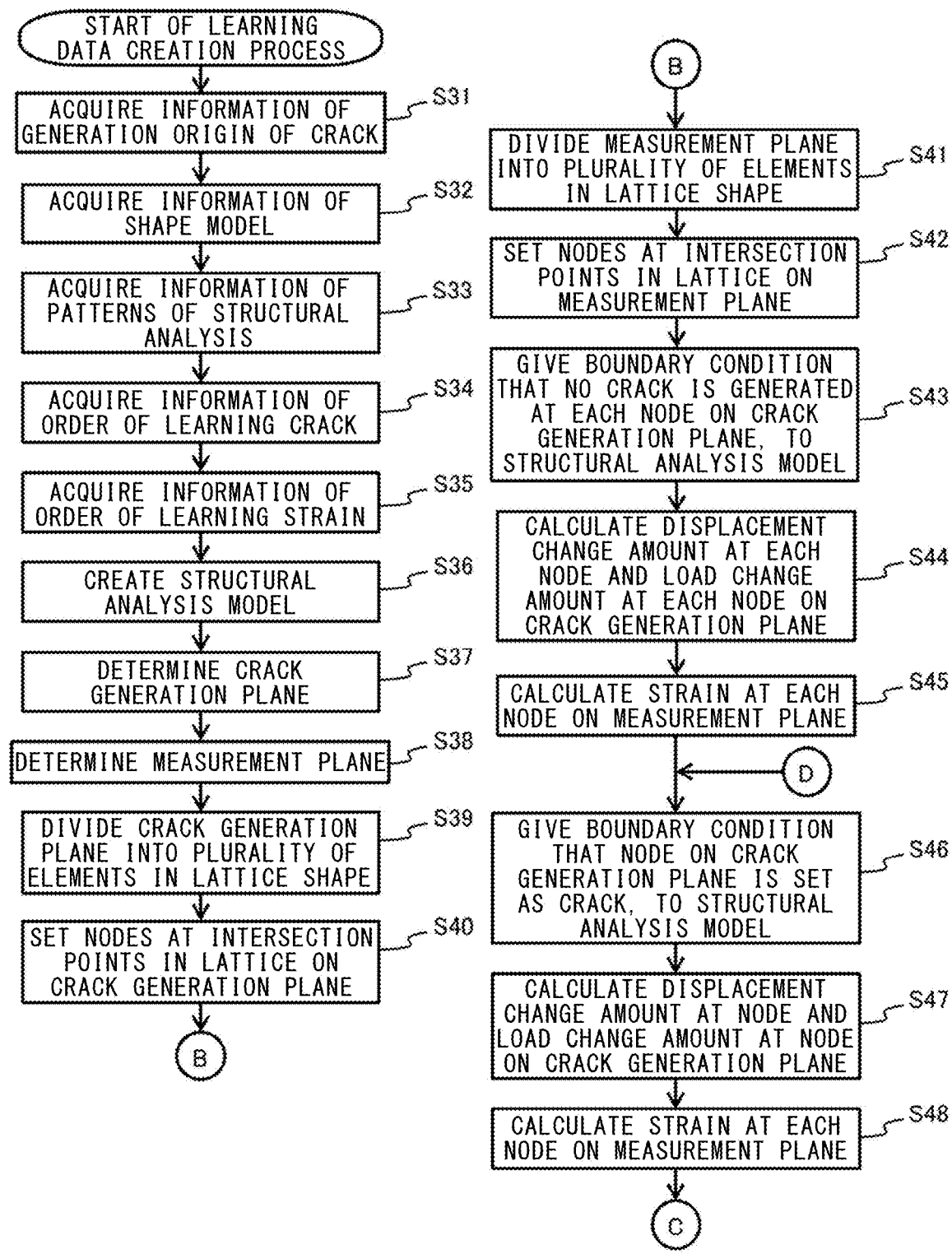
FIG. 16 is a flowchart showing the details of a learning data creation process in Embodiment 1.
Figure 17:
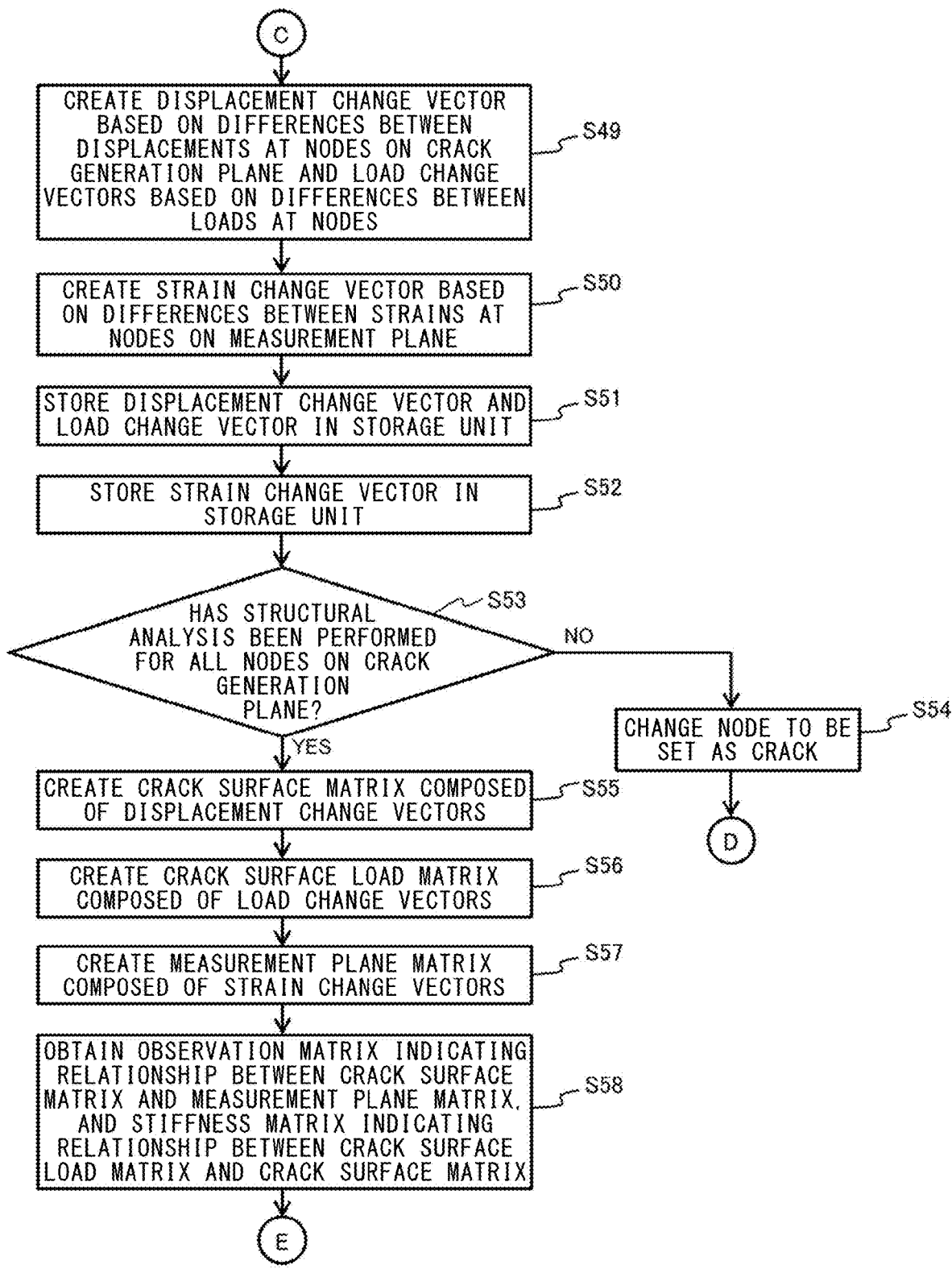
FIG. 17 is a flowchart showing the details of the learning data creation process in Embodiment 1.
Figure 18:
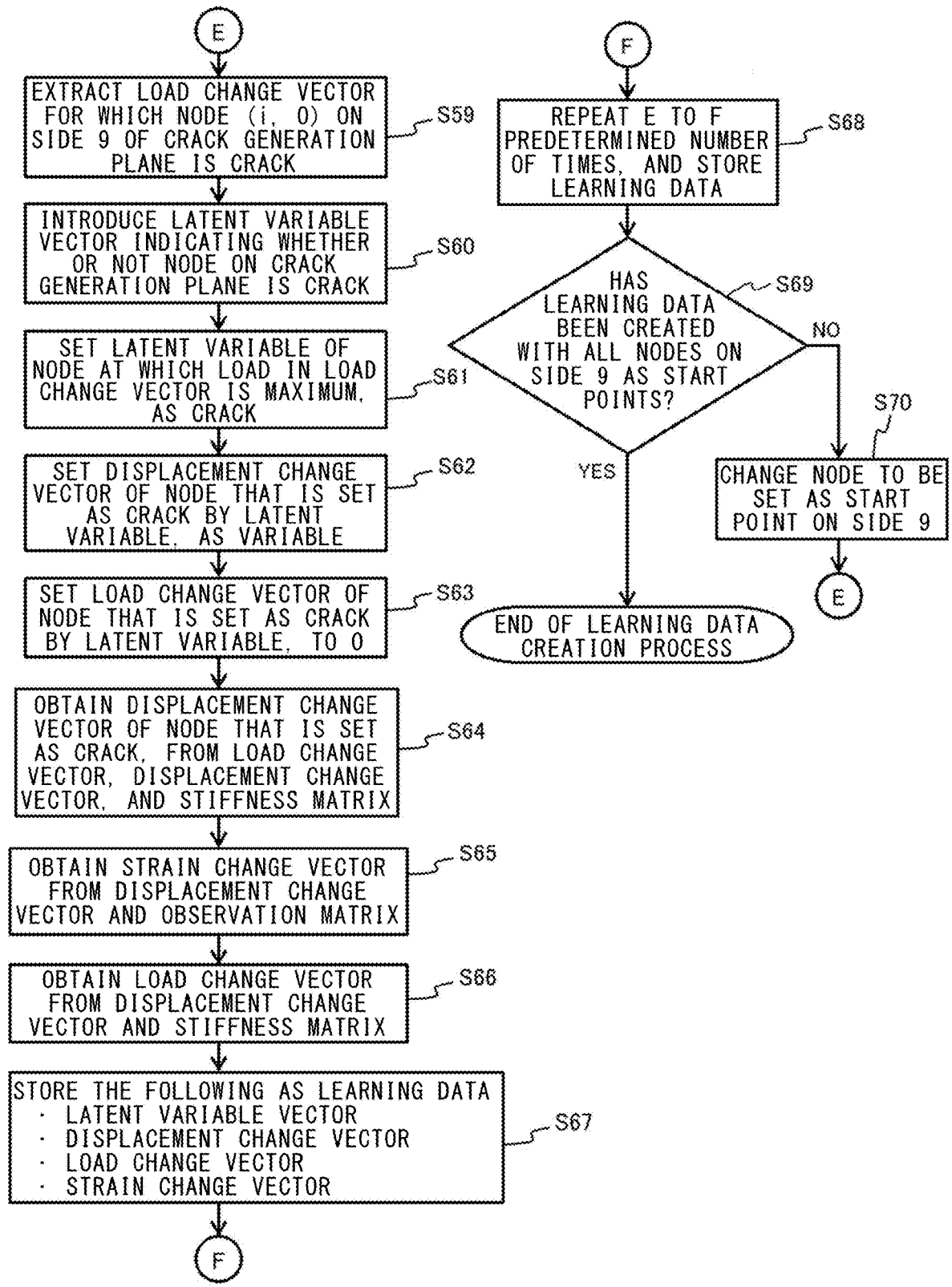
FIG. 18 is a flowchart showing the details of the learning data creation process in Embodiment 1.

In step S23, a learning data creation process is executed. The details of the learning data creation process are shown in FIG. 16, FIG. 17, and FIG. 18. Next, the process proceeds to step S24.

Figure 19:
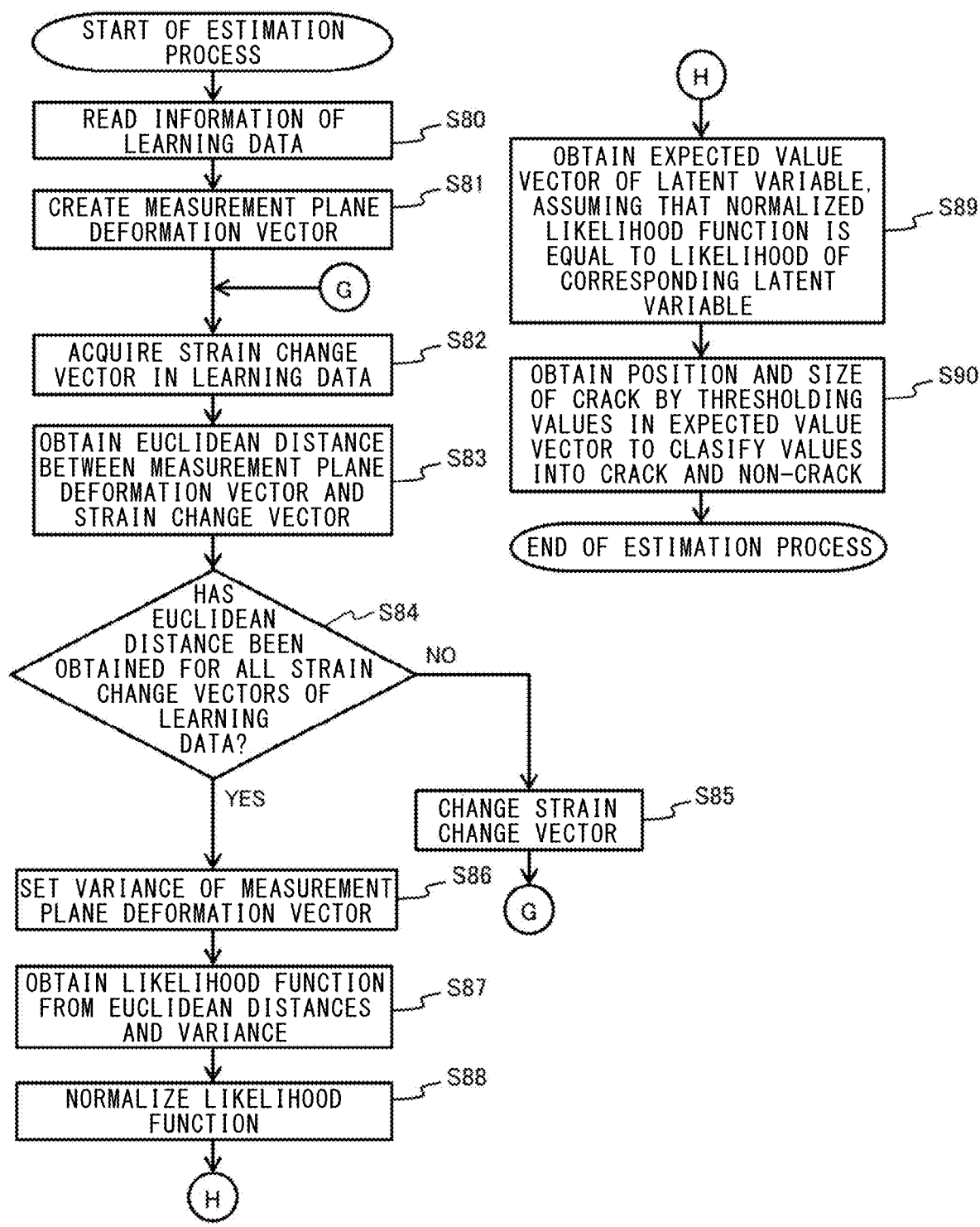
FIG. 19 is a flowchart showing the details of an estimation process in Embodiment 1.
Figure 20:
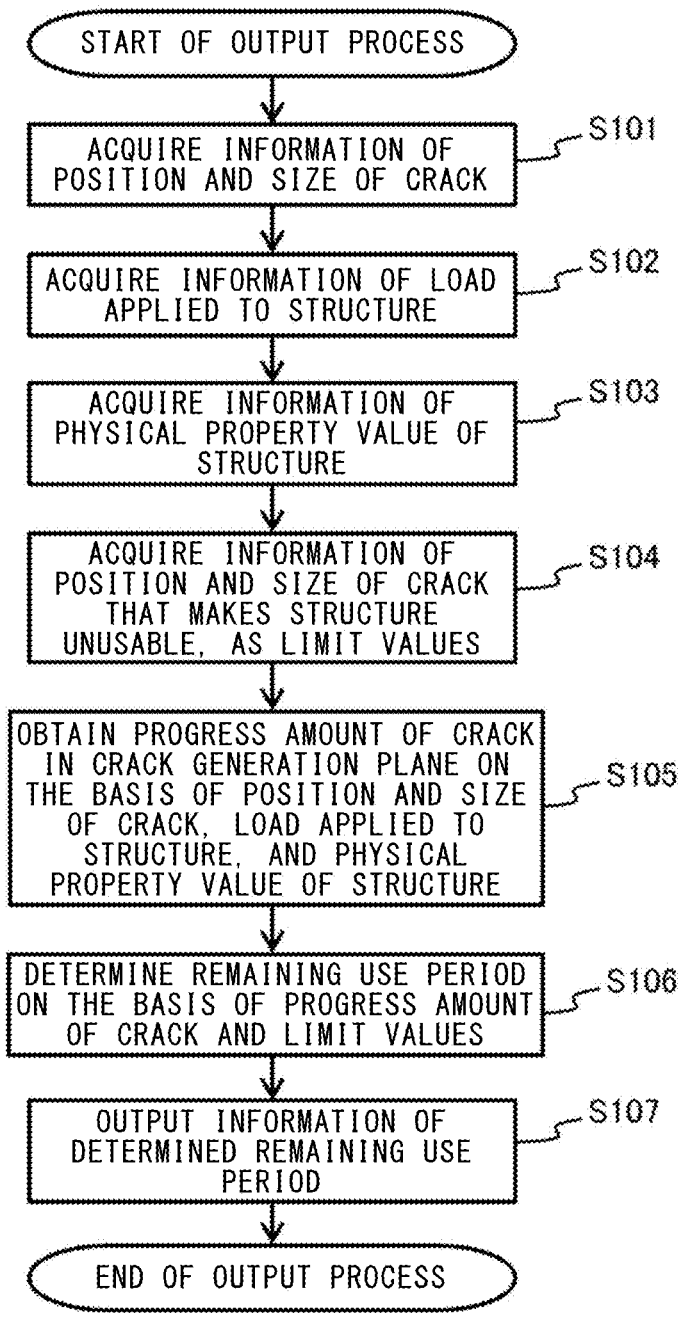
FIG. 20 is a flowchart showing an example of an output process in Embodiment 1.
Figure 21:
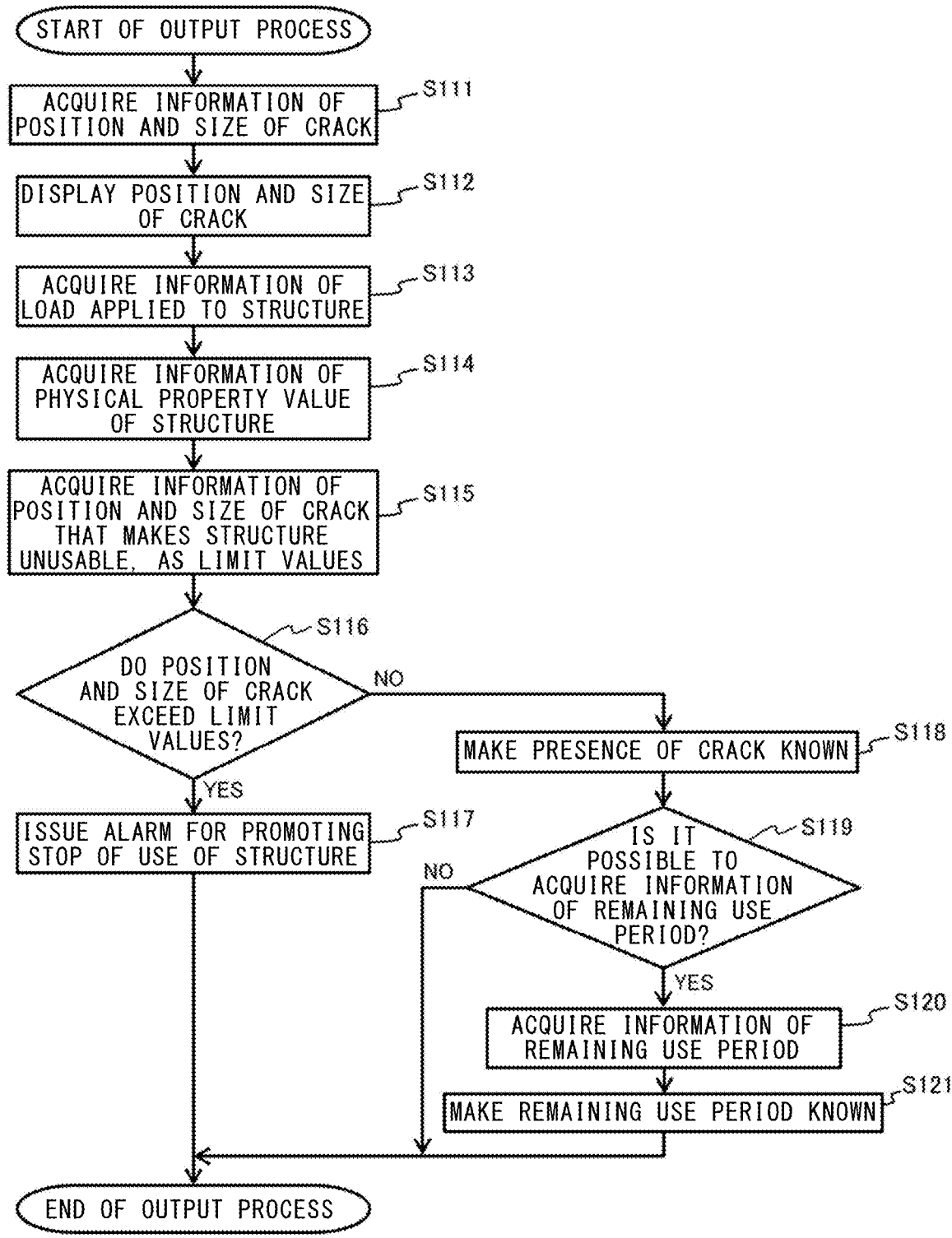
FIG. 21 is a flowchart showing an example of the output process in Embodiment 1.

In step S24, measurement data is acquired by the measurement unit 10, the acquired measurement data is sent to the vector similarity calculation unit 43 of the crack state estimation unit 42 via the data acquisition unit 41, and the process proceeds to step S25. In step S25, the crack state estimation unit 42 of the estimation unit 20 executes an estimation process, and the results thereof are sent to the analysis result output unit 60. The details of the estimation process are shown in FIG. 19. Next, the process proceeds to step S26. In step S26, the analysis result output unit 60 of the estimation unit 20 executes an output process, and ends the process. The details of the output process are shown in FIG. 20 and FIG. 21.

FIG. 16 to FIG. 18 are flowcharts showing the details of the learning data creation process in step S23 shown in FIG. 15. The learning data creation process shown in FIG. 16 to FIG. 18 is executed in the estimation model generation unit 32 of the estimation unit 20. In FIG. 16, in step S31, information of the generation origin of the crack 4 is acquired from the shape model generation unit 31, and the process proceeds to step S32. In step S32, information of the shape model is acquired from the shape model generation unit 31, and the process proceeds to step S33. In step S33, information of the patterns of structural analysis is acquired from the shape model generation unit 31, and the process proceeds to step S34. In step S34, information of the order of learning the crack 4 is acquired from the shape model generation unit 31, and the process proceeds to step S35. In step S35, information of the order of learning a strain is acquired from the shape model generation unit 31, and the process proceeds to step S36.

In step S36, a structural analysis model is created, and the process proceeds to step S37. In step S37, a crack generation plane is determined, and the process proceeds to step S38. In step S38, a measurement plane is determined, and the process proceeds to step S39. In step S39, the crack generation plane is divided into a plurality of elements 7 in a lattice shape, and the process proceeds to step S40. In step S40, nodes are set at intersection points in a lattice on the crack generation plane, and the process proceeds to step S41. In step S41, the measurement plane is divided into a plurality of elements 8 in a lattice shape, and the process proceeds to step S42. In step S42, nodes are set at intersection points in a lattice on the measurement plane, and the process proceeds to step S43.

In step S43, a boundary condition that no crack 4 is generated at each node on the crack generation plane is given to the structural analysis model, and the process proceeds to step S44. In step S44, under the boundary condition that no crack 4 is generated at each node on the crack generation plane, a displacement change amount and a load change amount at each node on the crack generation plane are calculated, and the process proceeds to step S45. In step S45, under the boundary condition that no crack 4 is generated at each node on the crack generation plane, a strain at each node on the measurement plane is calculated, and the process proceeds to step S46.

In step S46, a boundary condition that a node on the crack generation plane is set as the crack 4 is given to the structural analysis model, and the process proceeds to step S47. In step S47, under the boundary condition that a node on the crack generation plane is set as the crack 4, a displacement change amount and a load change amount at each node on the crack generation plane are calculated, and the process proceeds to step S48. In step S48, under the boundary condition that a node on the crack generation plane is set as the crack 4, a strain at each node on the measurement plane is calculated, and the process proceeds to step S49 in FIG. 17.

In FIG. 17, in step S49, a displacement change vector based on the differences between the displacement change amounts at the nodes on the crack generation plane and a load change vector based on the differences between the loads at the nodes are created, and the process proceeds to step S50. In step S50, a strain change vector based on the differences between the strains at the nodes on the measurement plane is created, and the process proceeds to step S51. In step S51, the displacement change and load change vectors are stored in the storage unit 50, and the process proceeds to step S52. In step S52, the strain change vector is stored in the storage unit 50, and the process proceeds to step S53.

In step S53, it is determined whether or not the structural analysis has been performed for all the nodes on the crack generation plane. If it is determined that the structural analysis has not been performed for all the nodes on the crack generation plane, the process proceeds to step S54. In step S54, the node to be set as the crack 4 is changed, and the process returns to step S46 in FIG. 16. On the other hand, if it is determined in step S53 that the structural analysis has been performed for all the nodes on the crack generation plane, the process proceeds to step S55.

In step S55, the crack surface matrix $\Delta_{crack\_diff}$ composed of the displacement change vectors as shown in Expression (1) is created, and the process proceeds to step S56. In step S56, the crack surface load matrix $Z_{crack\_diff}$ composed of the load change vectors as shown in Expression (3) is created, and the process proceeds to step S57. In step S57, the measurement plane matrix $E_{measure}$ composed of the strain change vectors as shown in Expression (2) is created, and the process proceeds to step S58. In step S58, the observation matrix H indicating the relationship between the crack surface matrix $\Delta_{crack\_diff}$ and the measurement plane matrix $E_{measure}$ as shown in Expression (6) is generated, the stiffness matrix G indicating the relationship between the crack surface load matrix $Z_{crack\_diff}$ and the crack surface matrix $\Delta_{crack\_diff}$ as shown in Expression (7) is generated, and the process proceeds to step S59 in FIG. 18.

In step S59, the load change vector for which the node on the side 9 of the crack generation plane is set as the crack 4 is extracted from the crack surface load matrix $Z_{crack\_diff}$, and the process proceeds to step S60. In step S60, the latent variable vector $\Gamma$ indicating whether or not the node on the crack generation plane is the crack 4 by "1" or "0" is introduced, and the process proceeds to step S61. In step S61, the node at which the load in the load change vector is the maximum is set as the crack 4, the latent variable of this node is set to "1", and the process proceeds to step S62. In step S62, the displacement change at the node for which the latent variable is set to "1" and which is set as the crack is set as an unknown, and the displacement change at the node for which the latent variable is set to "0" and which is not set as the crack is set to "0". As a result, the latent variable vector $\Gamma$ is, for example, as in Expression (9). Next, the process proceeds to step S63. In step S63, the load at the node for which the latent variable is set to "1" and which is set as the crack is set to "0", and the process proceeds to step S64.

In step S64, for example, as shown in Expression (11) to Expression (14), the displacement change vector of the node that is set as the crack is obtained from the load change vectors, the displacement change vectors, and the stiffness matrix G, and the process proceeds to step S65. In step S65, for example, as shown in Expression (15), a strain change vector is obtained from the displacement change vector obtained in the step S64 and the observation matrix H, and the process proceeds to step S66. In step S66, for example, as shown in Expression (16), a load change vector is obtained from the displacement change vector obtained in step S64 and the stiffness matrix G, and the process proceeds to step S67. In step S67, the latent variable vector, the displacement change vector, the load change vector, and the strain change vector which are obtained by the processes in step S59 to step S66 are stored as learning data in the storage unit 50, and the process proceeds to step S68.

In step S68, the processes shown in step S59 to step S67 are repeated a predetermined number of times, and learning data is stored. Next, the process proceeds to step S69.

In step S69, it is determined whether or not learning data has been created with all the nodes on the side 9 as start points, and if learning data has been created with all the nodes on the side 9 as start points, the learning data creation process is ended. If learning data has not been created with all the nodes on the side 9 as start points, the process proceeds to step S70. In step S70, the node to be set as a start point on the side 9 is changed, and the process proceeds to step S59.

FIG. 19 is a flowchart showing the details of the estimation process in step S25 shown in FIG. 15. The estimation process shown in FIG. 19 is executed in the crack state estimation unit 42 of the estimation unit 20. Step S80 to step S89 are executed by the vector similarity calculation unit 43 of the crack state estimation unit 42, and step S90 is executed by the crack analysis unit 44 of the crack state estimation unit 42.

In step S80, information of the learning data is read from the estimation model generation unit 32, and the process proceeds to step S81. In step S81, the measurement plane deformation vector shown in Expression (17) is read from the measurement unit 10 via the data acquisition unit 41, and the process proceeds to step S82. In step S82, a strain change vector is acquired from the learning data read from the estimation model generation unit 32, and the process proceeds to step S83. Although the information of the learning data is read from the estimation model generation unit 32 in step S80, and the strain change vector is acquired from the learning data in step S82, step S80 may be omitted, and the strain change vector in the learning data may be acquired from the estimation model generation unit 32 in step S82. In step S83, in order to obtain the similarity between the measurement plane deformation vector and the strain change vector acquired in step S82, the Euclidean distance which is the L2 norm as shown in Expression (18) is obtained, and the process proceeds to step S84.

In step S84, it is determined whether or not the Euclidean distance from the measurement plane deformation vector has been obtained for all the strain change vectors of the learning data. If the Euclidean distance has been obtained for all the strain change vectors, the process proceeds to step S86. If the Euclidean distance has not been obtained for all the strain change vectors, the process proceeds to step S85, the strain change vector is changed, and the process proceeds to step S82.

In step S86, the variance $\sigma^2$ of the measurement plane deformation vector is set, and the process proceeds to step S87. In step S87, the likelihood function shown in Expression (19) is obtained from the Euclidean distances obtained in step S83 and the variance set in step S86, and the process proceeds to step S88.

In step S88, the likelihood function is normalized by Expression (20) and Expression (21), and the process proceeds to step S89. In step S89, assuming that the normalized likelihood function is equal to the likelihood function of the latent variable corresponding to the normalized likelihood function, an expected value vector of the latent variable in the likelihood function as shown in Expression (22) is obtained. Next, the process proceeds to step S90. In step S90, the position and the size of the crack are obtained by thresholding each value in the expected value vector of the latent variable obtained in step S89 to classify each value into crack and non-crack, and the estimation process is ended.

FIG. 20 is a flowchart showing an example of the output process in step S26 shown in FIG. 15, and shows the details of a process of displaying the remaining use period of the structure 1 in the analysis result output unit 60 in FIG. 1. Step S101 to step S106 are executed by the output processing unit 61, and step S107 is executed by the display device 63.

In step S101, information of the position and the size of the crack 4 is acquired, and the process proceeds to step S102. In step S102, information of the load applied to the structure 1 is acquired, and the process proceeds to step S103. In step S103, information of the physical property value of the structure 1 is acquired, and the process proceeds to step S104. In step S104, information of the position and the size of the crack 4 that makes the structure 1 unusable is acquired as limit values, and the process proceeds to step S105. In step S105, a progression amount of the crack 4 in the crack generation plane is obtained on the basis of the position and the size of the crack 4, the load applied to the structure 1, and the physical property value of the structure 1. Next, the process proceeds to step S106. In step S106, a remaining use period is determined on the basis of the progression amount of the crack 4 and the limit values of the position and the size of the crack 4, and the process proceeds to step S107. In step S107, information of the determined remaining use period is outputted, and the output process is ended.

FIG. 21 is a flowchart showing an example of the output process in step S26 shown in FIG. 15, and shows the details of a process of issuing an alarm for promoting stop of the use of the structure 1 in the analysis result output unit 60 in FIG. 1. Step S111, step S113 to step S116, step S119, and step S120 are executed by the output processing unit 61. Step S117 and step S118 are executed by the alarm device 62 or the display device 63. Step S112 and step S121 are executed by the display device 63.

In step S111, information of the position and the size of the crack 4 is acquired, and the process proceeds to step S112. In step S112, the information of the position and the size of the crack 4 is displayed on the display device 63, and the process proceeds to step S113. In step S113, information of the load applied to the structure 1 is acquired, and the process proceeds to step S114. In step S114, information of the physical property value of the structure 1 is acquired, and the process proceeds to step S115. In step S115, information of the position and the size of the crack 4 that makes the structure 1 unusable is obtained as limit values, and the process proceeds to step S116. In step S116, it is determined whether or not the position and the size of the crack 4 exceed the limit values. If it is determined that the position and the size of the crack 4 exceed the limit values, the process proceeds to step S117. In step S117, an alarm for promoting stop of the use of the structure is issued in the alarm device 62 or the display device 63, and the output process is ended.

On the other hand, if it is determined in step S116 that the position and the size of the crack 4 do not exceed the limit values, the process proceeds to step S118. In step S118, the presence of the crack is made known through the alarm device 62 or the display device 63. Next, the process proceeds to step S119. In step S119, it is determined whether or not it is possible to acquire information of the remaining use period. If it is determined that it is not possible to acquire the information of the remaining use period, the output process is ended. On the other hand, if it is determined that it is possible to acquire the information of the remaining use period, the process proceeds to step S120. In step S120, the information of the remaining use period is acquired, and the process proceeds to step S121. In step S121, the remaining use period is displayed on the display device 63, and the output process is ended.

Figure 22:
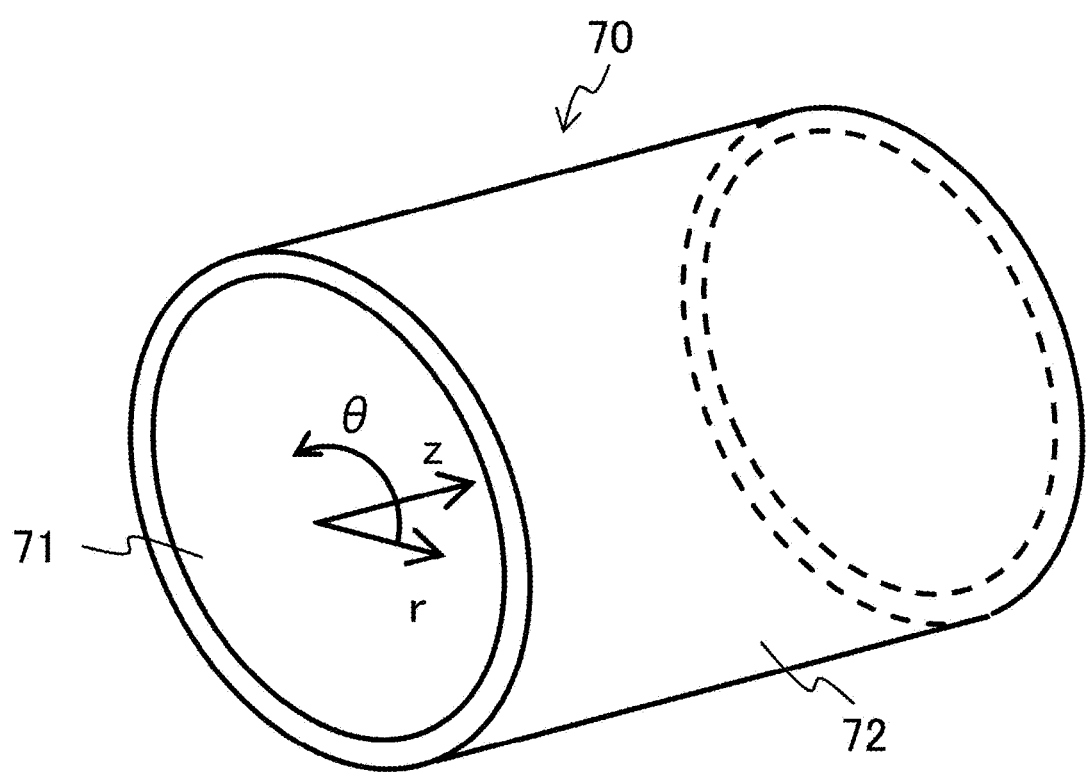
FIG. 22 shows reference coordinates set in a columnar member which is a further structure in Embodiment 1.
Figure 23:
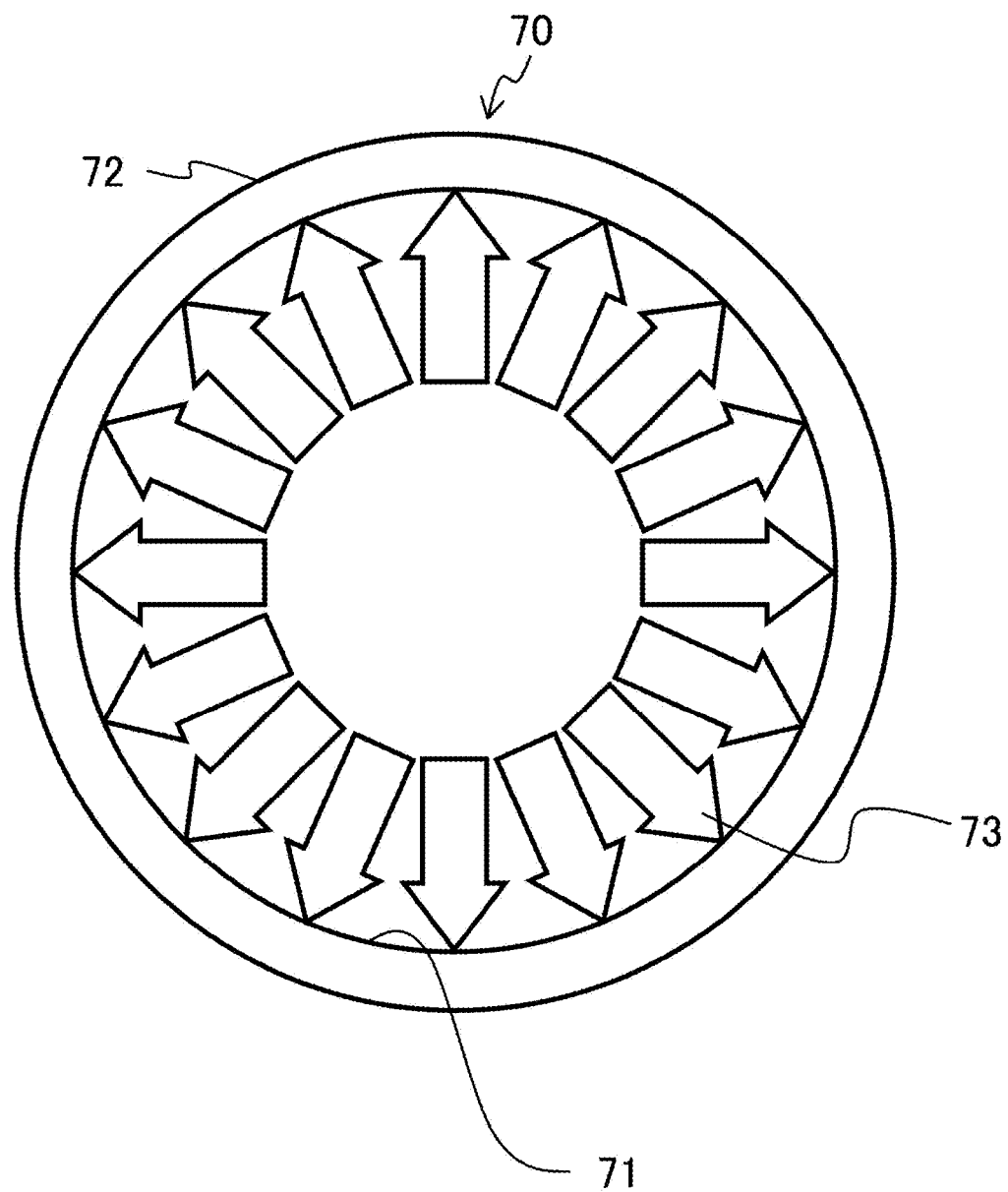
FIG. 23 shows a state where an internal pressure is applied to the columnar member which is a further structure in Embodiment 1.

In the above description, the flat plate is assumed as the structure 1 which is the estimation target, and is represented in the orthogonal coordinate system with the x axis, the y axis, and the z axis, but the estimation target is not limited thereto. The estimation target may be a columnar member 70 shown in FIG. 22. In FIG. 22, the columnar member 70 is represented in a cylindrical coordinate system with an r axis, a z axis, and an angle θ. FIG. 23 is a view of the columnar member 70 in FIG. 22 as seen from a z-axis direction. As shown in FIG. 23, an internal pressure 73 is applied to an inner circumferential surface 71 of the columnar member 70 during shrink fit. Therefore, the shape of an outer circumferential surface 72 is changed by the crack 4 being generated in the columnar member 70. The columnar member 70 is mounted, for example, on a holding ring of a rotor core protruding at an end portion of a rotor of a rotating electric machine, by shrink fit.

As described above, the crack estimation device 100 according to Embodiment 1 includes: the measurement unit 10 which sets the observation plane 2 in the surface of the structure 1 as a measurement plane and measures deformation of the measurement plane as a measurement plane deformation vector; the model generation unit 30 which generates a shape model obtained by modeling the shape of the structure 1, sets the candidate plane 3 inside the structure 1 as a crack generation plane, and sets deformation of the measurement plane when the crack 4 is generated in the crack generation plane, as a measurement plane estimated change vector for a plurality of types of crack candidates; and the crack state analysis unit 40 which estimates the crack 4 from output of the measurement unit 10 and output of the model generation unit 30, wherein the crack state analysis unit 40 obtains the similarity between the measurement plane deformation vector and the measurement plane estimated change vector, normalizes the similarity, and estimates the crack 4 generated in the crack generation plane from a result which is obtained by multiplying a vector of a state quantity indicating a state of the crack generation plane by the normalized similarity for each of the crack candidates, and adding together the results of the multiplication for all the crack candidates. Therefore, uniqueness of solution, existence of solution, and stability of solution are satisfied, and the crack 4 in the crack generation plane inside the structure 1 can be accurately estimated.

Embodiment 2

Figure 24:
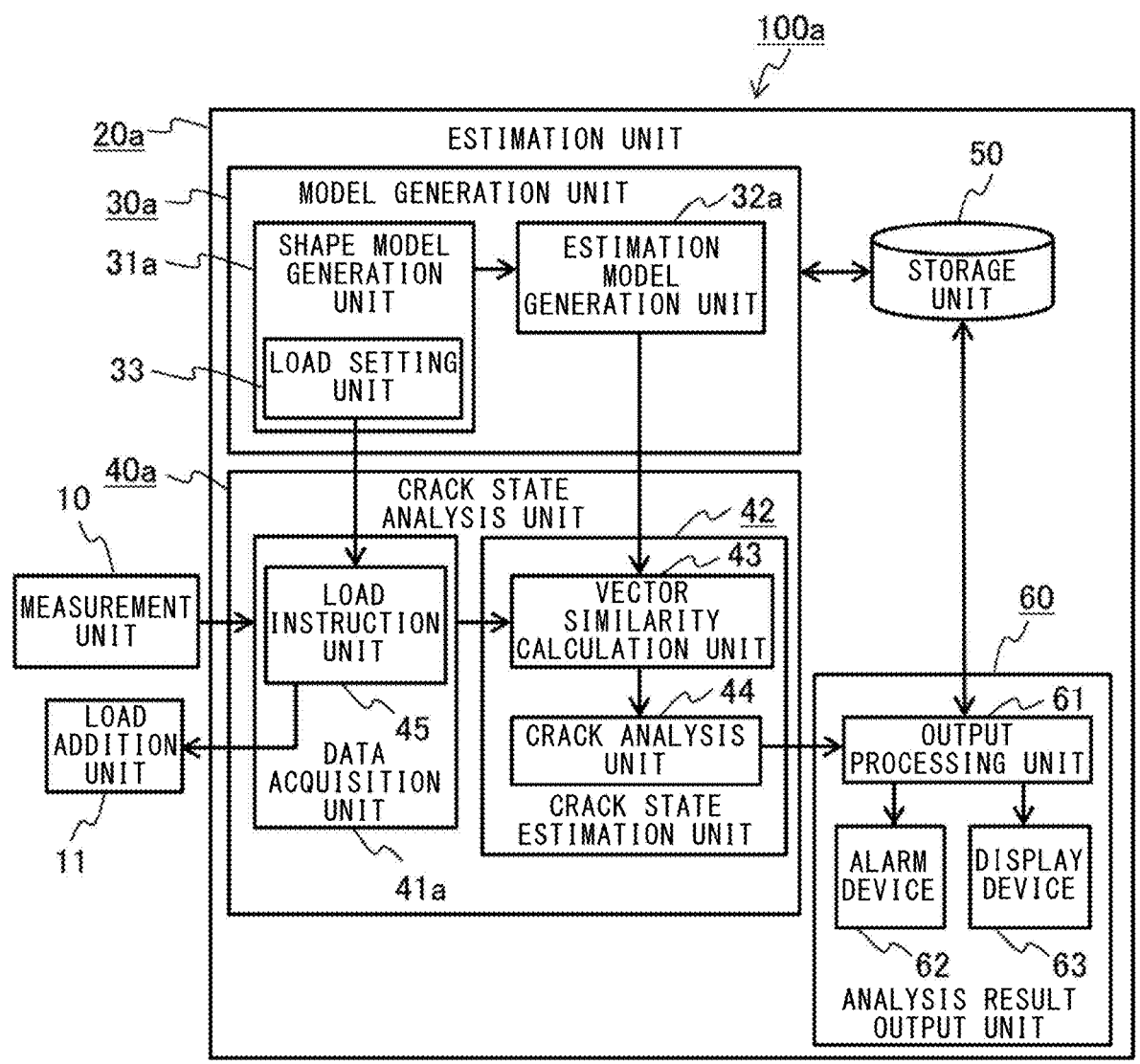
FIG. 24 is a block diagram showing the configuration of a crack estimation device according to Embodiment 2.

FIG. 24 shows the configuration of a crack estimation device 100a according to Embodiment 2. When the crack estimation device 100a according to Embodiment 2 shown in FIG. 24 is compared with the crack estimation device 100 according to Embodiment 1 shown in FIG. 1, the estimation unit 20 is replaced with an estimation unit 20a, the model generation unit 30 is replaced with a model generation unit 30a, the shape model generation unit 31 is replaced with a shape model generation unit 31a, the estimation model generation unit 32 is replaced with an estimation model generation unit 32a, the crack state analysis unit 40 is replaced with a crack state analysis unit 40a, and the data acquisition unit 41 is replaced with a data acquisition unit 41a. In addition, the shape model generation unit 31a includes a load setting unit 33, and the data acquisition unit 41a includes a load instruction unit 45. Furthermore, a load addition unit 11 is newly included. The other configuration of the crack estimation device 100a according to Embodiment 2 is the same as the configuration of the crack estimation device 100 according to Embodiment 1.

The load setting unit 33 outputs information of the magnitude and the position of a load to be applied to the structure 1, to the load instruction unit 45. The load instruction unit 45 sends an instruction to the load addition unit 11 on the basis of the information received from the load setting unit 33. When measurement is performed in the measurement unit 10, the load addition unit 11 applies a load having a magnitude instructed from the load instruction unit 45, to a position on the structure 1 instructed from the load instruction unit 45. Accordingly, the measurement unit 10 can measure a surface change on the observation plane 2 in a state where the load is applied to the structure 1.

Figure 25:
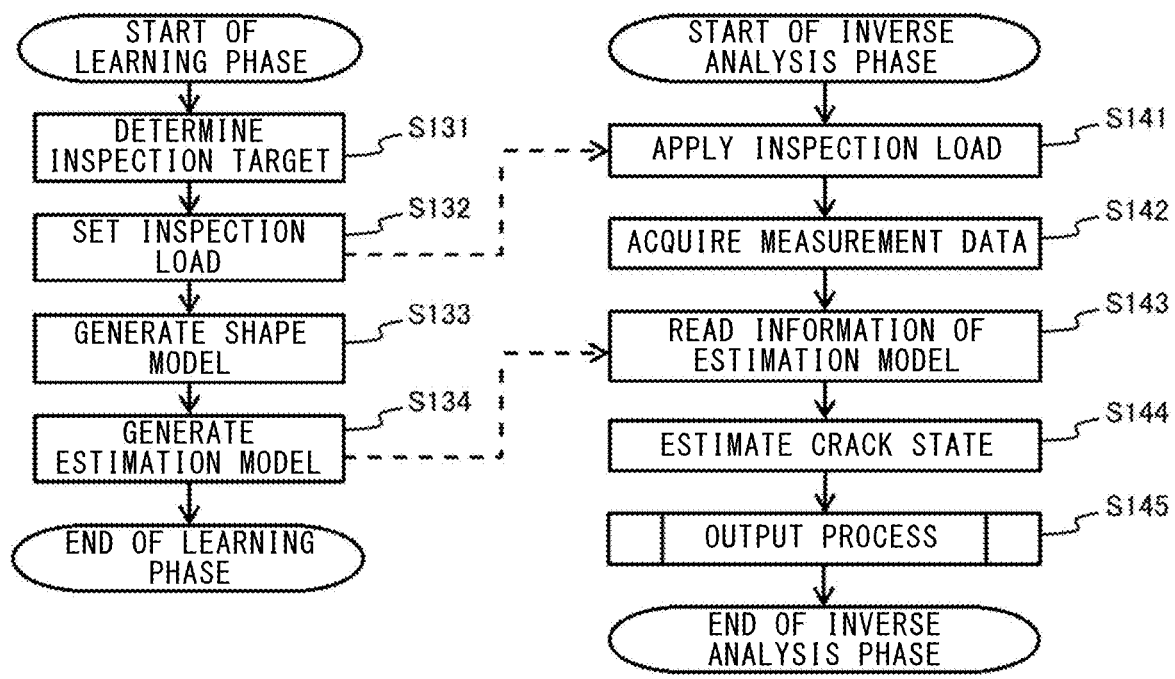
FIG. 25 is a flowchart showing processes in a learning phase and an inverse analysis phase in Embodiment 2.

Next, the operation of the crack estimation device 100a will be described with reference to a flowchart. The basic procedure of the processes executed by the crack estimation device 100a is the same as shown in FIG. 15. FIG. 25 is a flowchart showing processes in a learning phase and an inverse analysis phase in the crack estimation device 100a according to Embodiment 2. Step S131 to step S134 are the processes executed in the learning phase, and step S141 to step S145 are the processes executed in the inverse analysis phase.

In the learning phase, in step S131, an inspection target is determined in the shape model generation unit 31a. The process in step S131 corresponds to step S1l to step S14 in FIG. 15. Next, the process proceeds to step S132. In step S132, an inspection load is set in the load setting unit 33, and the process proceeds to step S133. In step S133, a shape model is generated in the shape model generation unit 31a. The process in step S133 corresponds to step S15 to step S22 in FIG. 15. Next, the process proceeds to step S134. In step S134, an estimation model is generated in the estimation model generation unit 32a, and the learning phase ends. The process in step S134 corresponds to step S23 in FIG. 15. Here, in step S134, an estimation model is generated under a condition that the inspection load set in step S132 is applied to the structure 1.

In the inverse analysis phase, in step S141, the inspection load is applied to the structure 1. Specifically, first, the load instruction unit 45 acquires information of the inspection load set in step S132, from the load setting unit 33. The load instruction unit 45 having acquired the information of the inspection load sends an instruction to the load addition unit 11 on the basis of the information received from the load setting unit 33. When measurement is performed in the measurement unit 10, the load addition unit 11 applies a load having a magnitude instructed from the load instruction unit 45, to a position on the structure 1 instructed from the load instruction unit 45. Next, the process proceeds to step S142.

In step S142, measurement data acquired by the measurement unit 10 is sent to the vector similarity calculation unit 43 of the crack state estimation unit 42 via the data acquisition unit 41a. At this time, the measurement unit 10 measures surface deformation of the observation plane in a state where the load is applied to the structure 1 by the load addition unit 11. The process in step S142 corresponds to step S24 in FIG. 15. Next, the process proceeds to step S143. In step S143, the vector similarity calculation unit 43 reads information of learning data from the estimation model generation unit 32a. The process in step S143 corresponds to step S80 in FIG. 19. Next, the process proceeds to step S144. In step S144, a crack state is estimated in the vector similarity calculation unit 43 and the crack analysis unit 44 of the crack state estimation unit 42. The process in step S144 corresponds to step S81 to step S90 in FIG. 19. At this time, the vector similarity calculation unit 43 and the crack analysis unit 44 obtain the position and the size of the crack 4 using learning data created under a condition that the inspection load is applied to the structure 1, and data acquired from the measurement unit 10 in a state where the load is applied to the structure 1. Next, the process proceeds to step S145. In step S145, an output process is executed in the analysis result output unit 60. The process in step S145 corresponds to step S26 in FIG. 15. This is the end of the inverse analysis phase.

As described above, the model generation unit 30a sets deformation of the measurement plane in a state where a load is applied to the structure 1, as a measurement plane estimated change vector, and in a state where the load is applied to the structure 1, the measurement unit 10 measures deformation of the measurement plane as a measurement plane deformation vector. Therefore, it is also possible to inspect a structure 1 to which no load has been applied, so that it is possible to inspect more types of structures 1.

Embodiment 3

Figure 26:
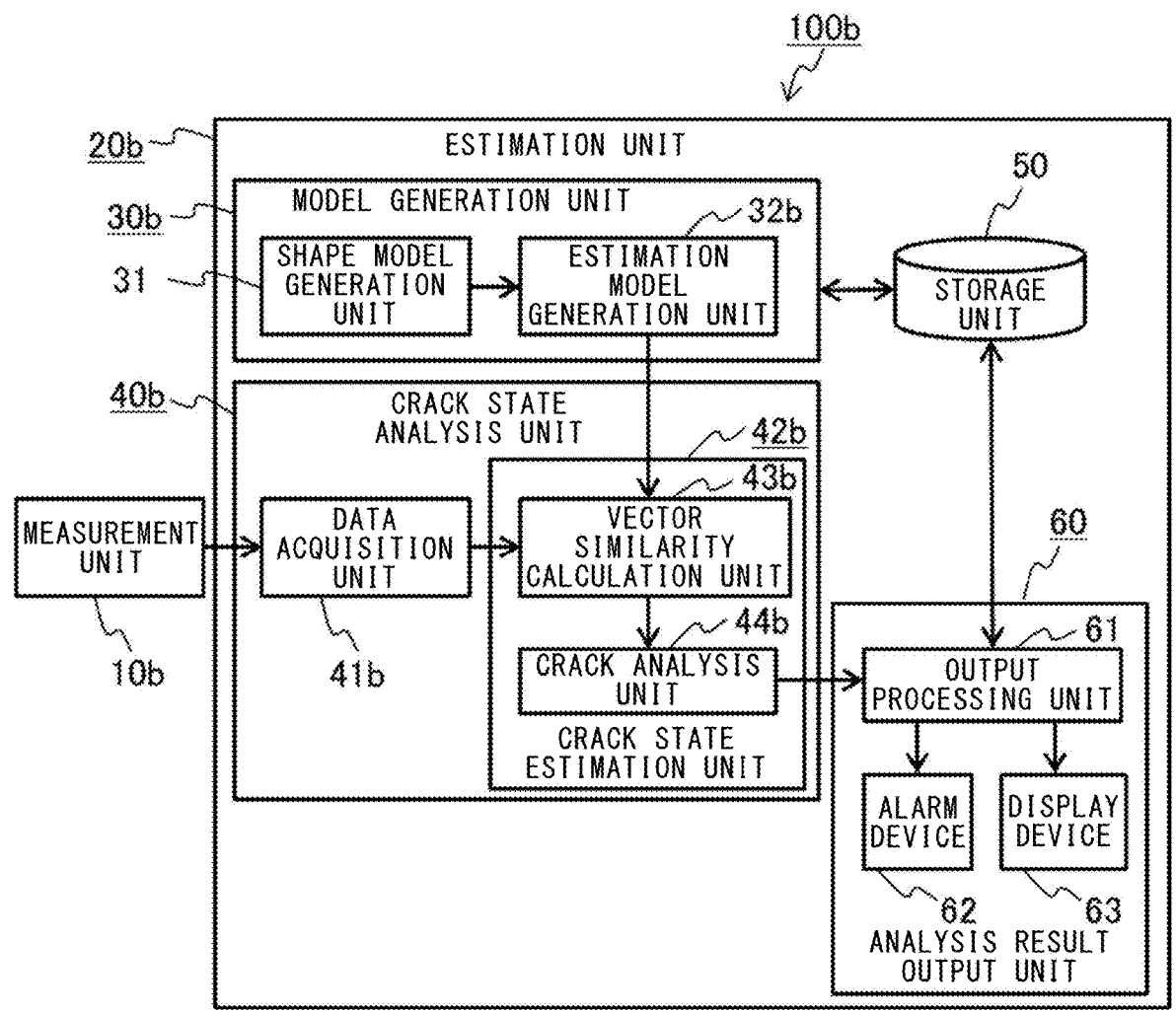
FIG. 26 is a block diagram showing the configuration of a crack estimation device according to Embodiment 3.

FIG. 26 shows the configuration of a crack estimation device 100b according to Embodiment 3. When the crack estimation device 100b according to Embodiment 3 shown in FIG. 26 is compared with the crack estimation device 100 according to Embodiment 1 shown in FIG. 1, the measurement unit 10 is replaced with a measurement unit 10b, the estimation unit 20 is replaced with an estimation unit 20b, the model generation unit 30 is replaced with a model generation unit 30b, the estimation model generation unit 32 is replaced with an estimation model generation unit 32b, the crack state analysis unit 40 is replaced with a crack state analysis unit 40b, the data acquisition unit 41 is replaced with a data acquisition unit 41b, the crack state estimation unit 42 is replaced with a crack state estimation unit 42b, the vector similarity calculation unit 43 is replaced with a vector similarity calculation unit 43b, and the crack analysis unit 44 is replaced with a crack analysis unit 44b. The other configuration of the crack estimation device 100b according to Embodiment 3 is the same as the configuration of the crack estimation device 100 according to Embodiment 1. In the crack estimation device 100 according to Embodiment 1, a strain change is used as deformation at each node on the measurement plane, but in the crack estimation device 100b according to Embodiment 3, at least one of a strain change, a displacement change, and an angle change is used as deformation at each node on the measurement plane.

In the case where a strain change is used as deformation at each node on the measurement plane, the same operation as in the crack estimation device 100 according to Embodiment 1 is performed.

Figure 27:
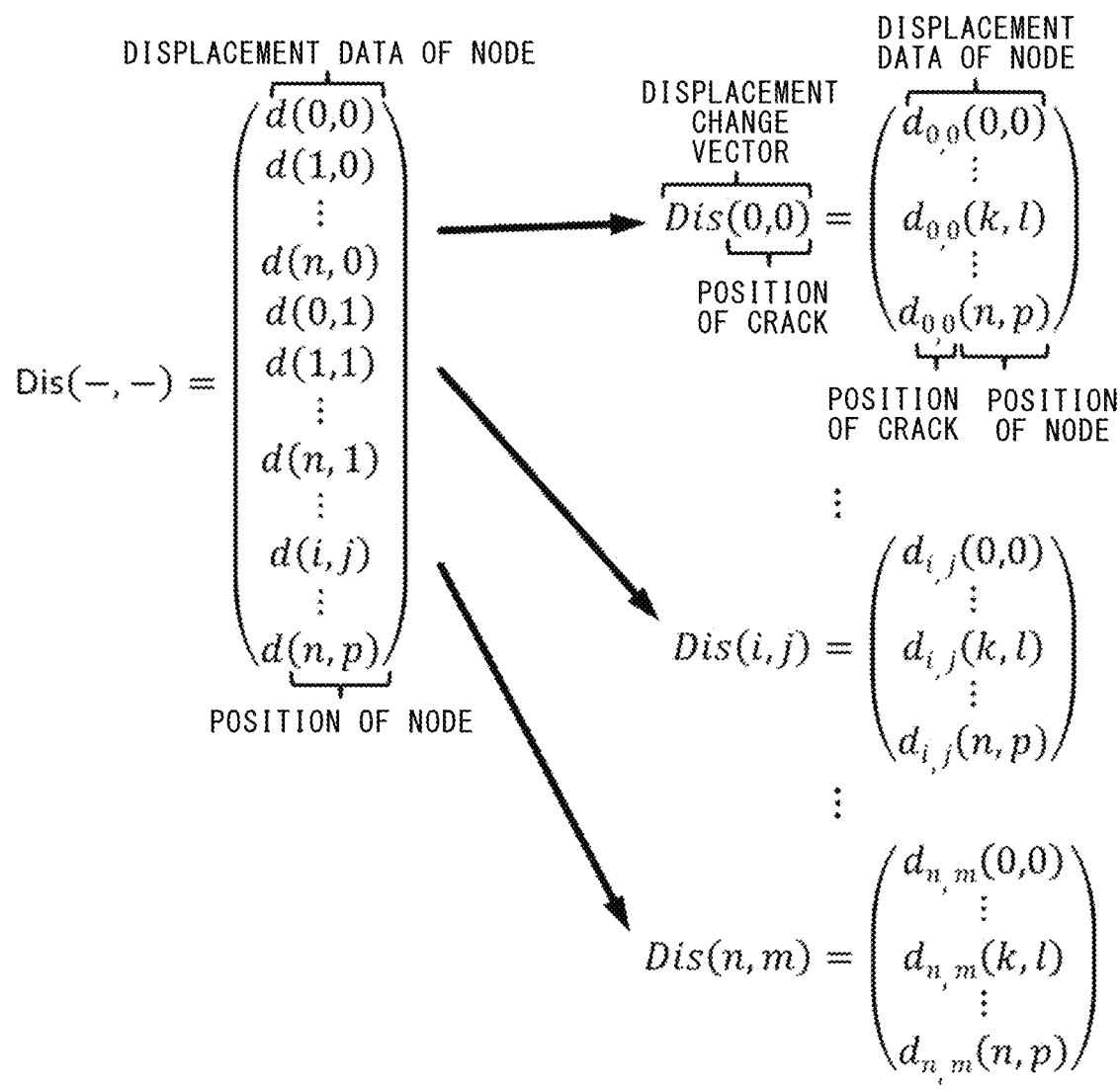
FIG. 27 shows displacement change vectors in an observation plane in Embodiment 3.

Next, the case where a displacement change is used as deformation at each node on the measurement plane will be described. In the case where a displacement change is used as deformation at each node on the measurement plane, the estimation model generation unit 32*b* of the model generation unit 30*b* creates a displacement change vector based on the differences between displacements at the nodes on the measurement plane in a structural analysis model. FIG. 27 shows a displacement change vector representing a displacement change amount at each node on the observation plane 2 in FIG. 7 at each position of the crack 4 in the candidate plane 3 in FIG. 5 in Embodiment 3. As shown in FIG. 27, displacement data of the respective nodes included in a column vector of Dis(-, -) are arranged in the order of moving the crack 4 to be assumed at each node. d(i, j) is a displacement change at the node at the (i, j) position on the observation plane 2. Furthermore, for example, $d_{0,0}(k, l)$ is displacement data of the node at the (k, l) position on the observation plane 2 when the crack 4 has been generated at the node at the position (0, 0) on the candidate plane 3, and Dis(0, 0) is a displacement change vector when the crack 4 has been generated at the node at the position (0, 0) on the candidate plane 3.

Expression (23) below shows a measurement plane matrix $Dis_{measure}$ composed of a plurality of displacement change vectors in FIG. 27. In the case where a displacement change is used as deformation at each node on the measurement plane, $Dis_{measure}$ is used as a measurement plane matrix. Dis(0, 0) to Dis(n, m) which are the displacement change vectors shown in FIG. 27 are column vectors, and an array of these column vectors in the order of moving the crack 4 to be assumed at each node is $Dis_{measure}$ shown in Expression (23).

[Mathematical 23]

$$Dis_{measure} = [\,Dis(0, 0) \;\ldots\; Dis(i, j) \;\ldots\; Dis(n, m)\,]$$
$$= \begin{bmatrix} d_{0,0}(0, 0) & \ldots & d_{i,j}(0, 0) & \ldots & d_{n,m}(0, 0) \\ \vdots & \ddots & \vdots & \ddots & \vdots \\ d_{0,0}(k, l) & \ldots & d_{i,j}(k, l) & \ldots & d_{n,m}(k, l) \\ \vdots & \ddots & \vdots & \ddots & \vdots \\ d_{0,0}(n, p) & \ldots & d_{i,j}(n, p) & \ldots & d_{n,m}(n, p) \end{bmatrix} \quad (23)$$

In the case where a displacement change is used as deformation at each node on the measurement plane, the measurement unit 10*b* includes a displacement sensor in order to measure a displacement at each node on the observation plane 2. As the displacement sensor, for example, a laser displacement sensor, an eddy current loss type displacement sensor, a capacitance type displacement sensor, a contact type displacement sensor, a wire type displacement sensor, a laser micrometer, or the like is used. The measurement unit 10*b* measures a surface displacement change on the observation plane 2 and outputs the surface displacement change as a measurement plane deformation vector.

The crack state analysis unit 40*b* obtains a Euclidean distance as the similarity between the measurement plane deformation vector of the displacement change acquired from the measurement unit 10*b* and the measurement plane matrix $Dis_{measure}$, using the measurement plane matrix $Dis_{measure}$ instead of the measurement plane matrix $E_{measure}$, and estimates the position and the size of the crack 4 in the crack generation plane.

Figure 28:
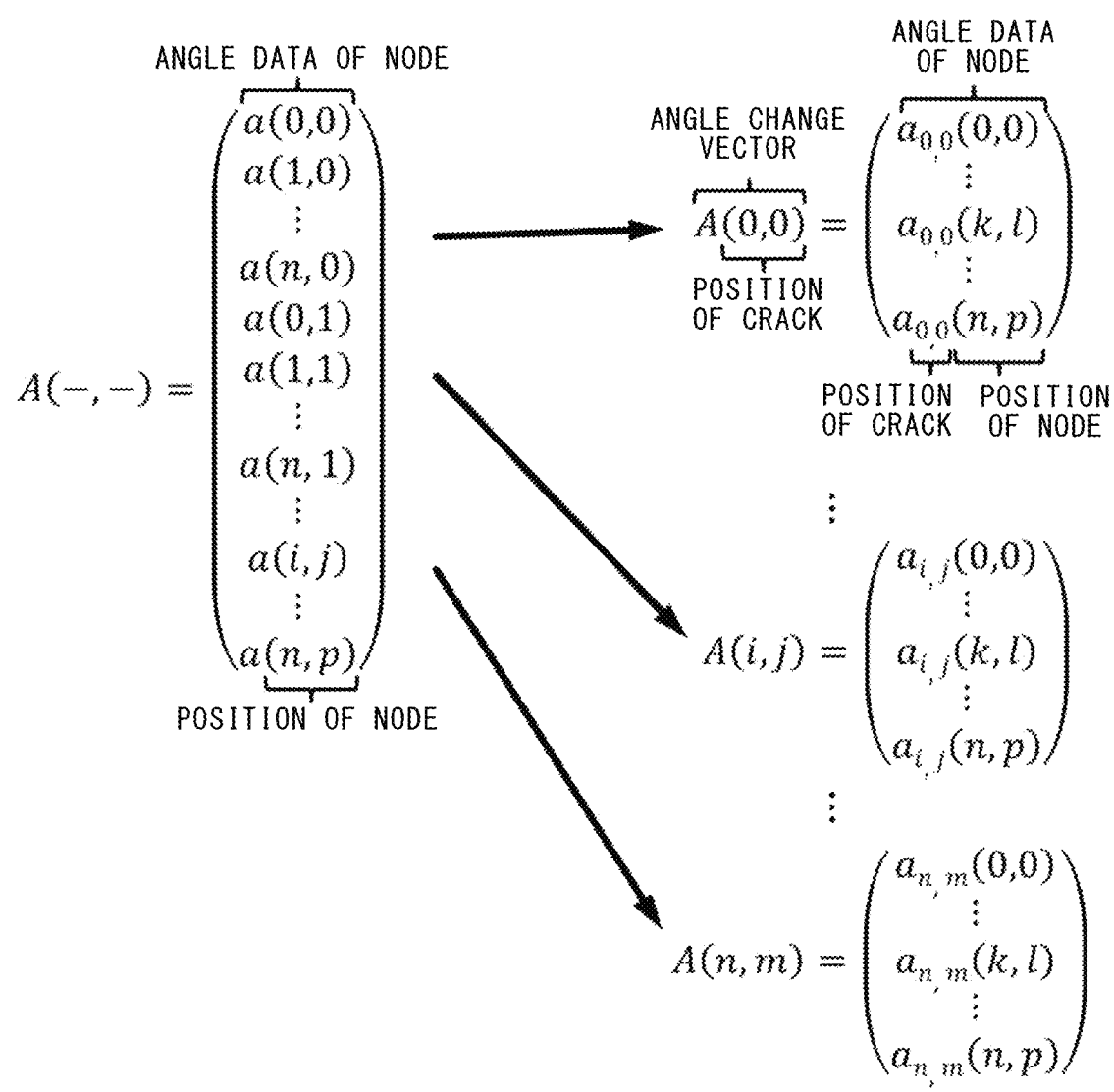
FIG. 28 shows angle change vectors in the observation plane in Embodiment 3.

Next, the case where an angle change is used as deformation at each node on the measurement plane will be described. In the case where an angle change is used as deformation at each node on the measurement plane, the estimation model generation unit 32*b* of the model generation unit 30*b* creates an angle change vector based on the differences between angles at the nodes on the measurement plane in a structural analysis model. FIG. 28 shows an angle change vector representing an angle change amount at each node on the observation plane 2 in FIG. 7 at each position of the crack 4 in the candidate plane 3 in FIG. 5 in Embodiment 3. As shown in FIG. 28, angle data of the respective nodes included in a column vector of A(-, -) are arranged in the order of moving the crack 4 to be assumed at each node. a(i, j) is an angle change at the node at the (i, j) position on the observation plane 2. Furthermore, for example, $a_{0,0}(k, l)$ is angle data of the node at the (k, l) position on the observation plane 2 when the crack 4 has been generated at the node at the position (0, 0) on the candidate plane 3, and A(0, 0) is an angle change vector when the crack 4 has been generated at the node at the position (0, 0) on the candidate plane 3.

Expression (24) below shows a measurement plane matrix $A_{measure}$ composed of a plurality of angle change vectors in FIG. 28. In the case where an angle change is used as deformation at each node on the measurement plane, $A_{measure}$ is used as a measurement plane matrix. A(0, 0) to A(n, m) which are the angle change vectors shown in FIG. 28 are column vectors, and an array of these column vectors in the order of moving the crack 4 to be assumed at each node is $A_{measure}$ shown in Expression (24).

[Mathematical 24]

$$A_{measure} = [\,A(0, 0) \;\ldots\; A(i, j) \;\ldots\; A(n, m)\,]$$
$$= \begin{bmatrix} a_{0,0}(0, 0) & \ldots & a_{i,j}(0, 0) & \ldots & a_{n,m}(0, 0) \\ \vdots & \ddots & \vdots & \ddots & \vdots \\ a_{0,0}(k, l) & \ldots & a_{i,j}(k.l) & \ldots & a_{n,m}(k, l) \\ \vdots & \ddots & \vdots & \ddots & \vdots \\ a_{0,0}(n, p) & \ldots & a_{i,j}(n, p) & \ldots & a_{n,m}(n, p) \end{bmatrix} \quad (24)$$

In the case where an angle change is used as deformation at each node on the measurement plane, the measurement unit 10*b* includes an inclination sensor in order to measure an angle at each node on the observation plane 2.

The crack state analysis unit 40*b* obtains a Euclidean distance as the similarity between the measurement plane deformation vector of the angle change acquired from the measurement unit 10*b* and the measurement plane matrix $A_{measure}$, using the measurement plane matrix $A_{measure}$ instead of the measurement plane matrix $E_{measure}$, and estimates the position and the size of the crack 4 in the crack generation plane.

In the case where any of a strain change, a displacement change, and an angle change is selected and used as deformation at each node on the measurement plane, strain change vectors, displacement change vectors representing a displacement change amount at each node on the measurement plane, and angle change vectors representing an angle change amount at each node on the measurement plane are all stored as learning data, and the measurement unit 10*b* measures at least one of a strain, a displacement, and an angle at each node on the observation plane 2.

In the case where a displacement change or an angle change is used as deformation of the measurement plane instead of a strain change, it is possible to measure a change on the observation plane 2 in the structure 1 in a shorter time and with higher accuracy than strain measurement. In addition, in the case where any of a strain change, a displacement change, and an angle change is selected and used as deformation at each node on the measurement plane, it is possible to handle various structures 1.

Embodiment 4

Figure 29:
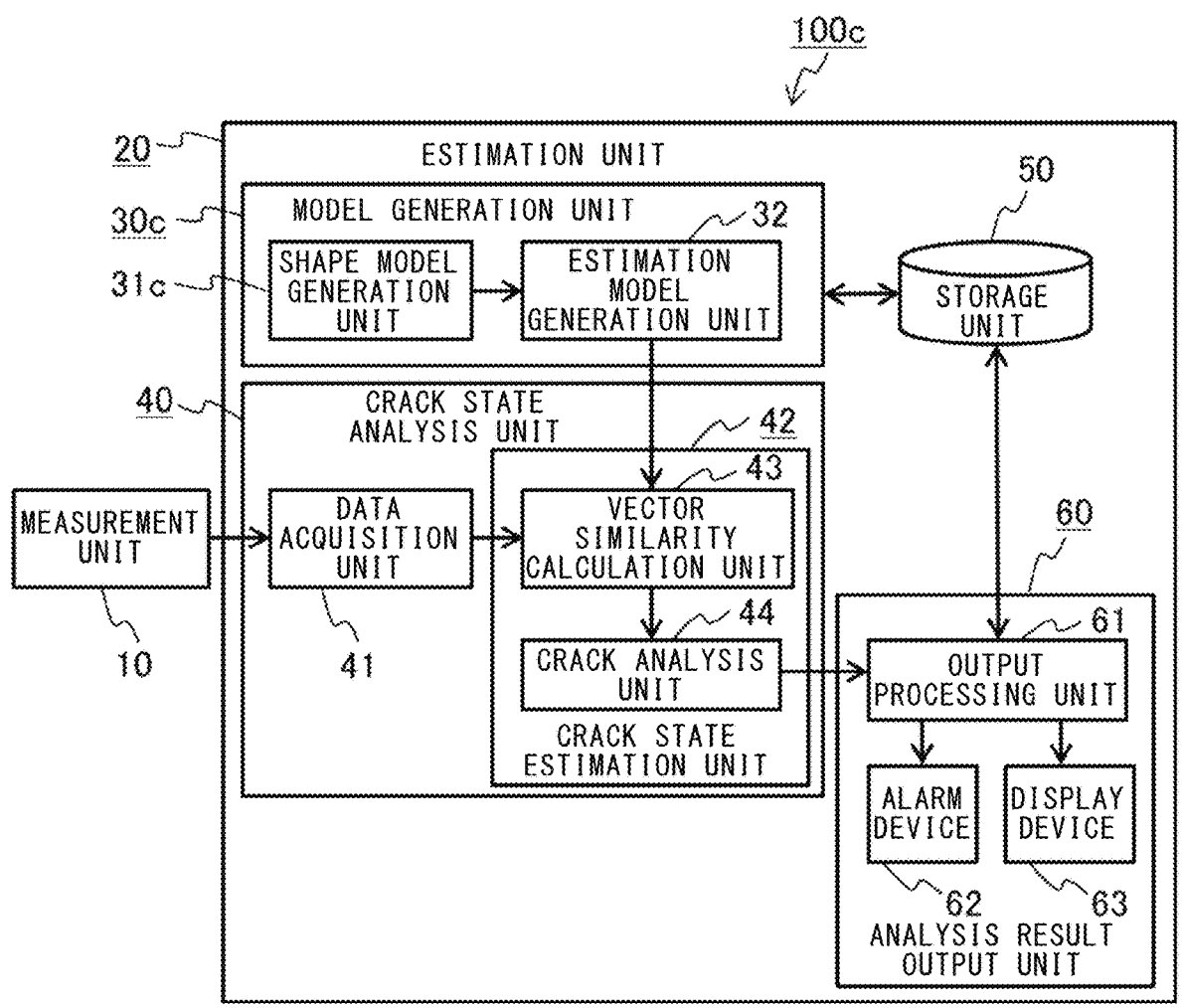
FIG. 29 is a block diagram showing the configuration of a crack estimation device according to Embodiment 4.

FIG. 29 shows the configuration of a crack estimation device 100c according to Embodiment 4. When the crack estimation device 100c according to Embodiment 4 shown in FIG. 29 is compared with the crack estimation device 100 according to Embodiment 1 shown in FIG. 1, the model generation unit 30 is replaced with a model generation unit 30c, and the shape model generation unit 31 is replaced with a shape model generation unit 31c. The other configuration of the crack estimation device 100c according to Embodiment 4 is the same as the configuration of the crack estimation device 100 according to Embodiment 1.

Figure 30:
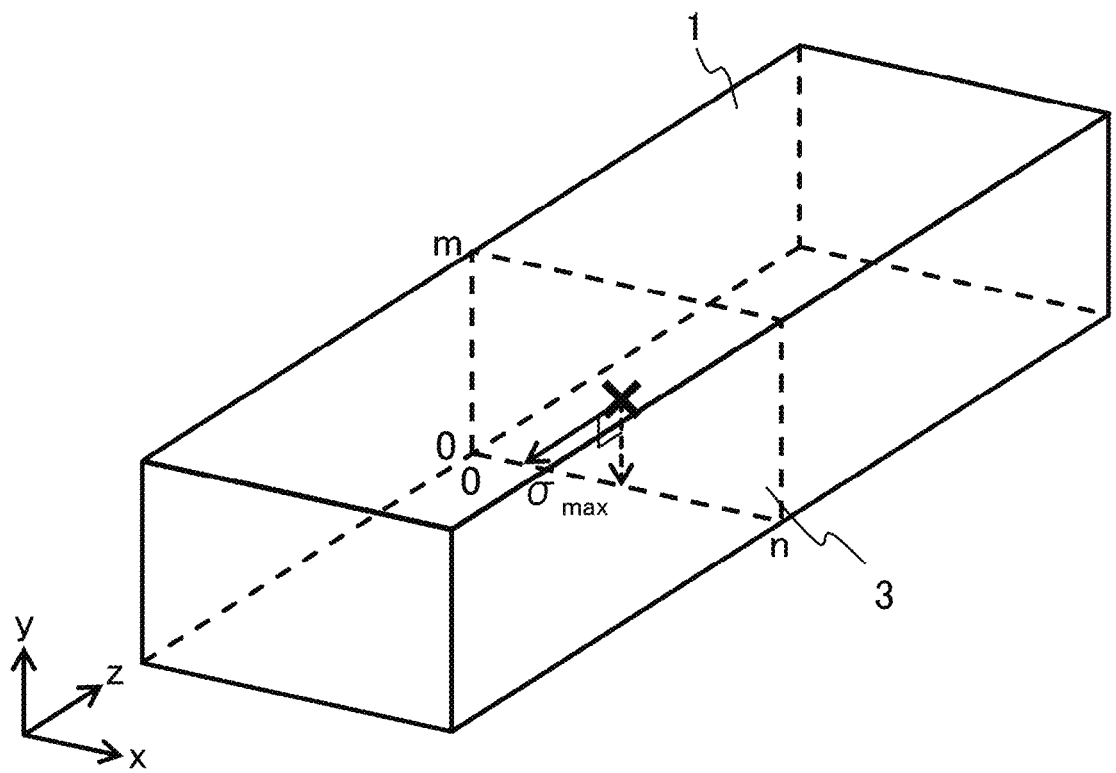
FIG. 30 shows a candidate plane of a structure in Embodiment 4.

FIG. 30 shows a state of the candidate plane 3 of the structure 1 in Embodiment 4. As shown in FIG. 30, if a point at which stress becomes maximum stress $\sigma_{max}$ has been determined by measurement or structural analysis, the shape model generation unit 31c of the model generation unit 30c identifies the point at which the stress becomes maximum, as a generation location of the crack 4. Furthermore, the shape model generation unit 31c of the model generation unit 30c determines a plane that is perpendicular to the direction of the stress at the identified generation location of the crack 4 and includes the identified generation location of the crack 4, as the candidate plane 3.

Figure 31:
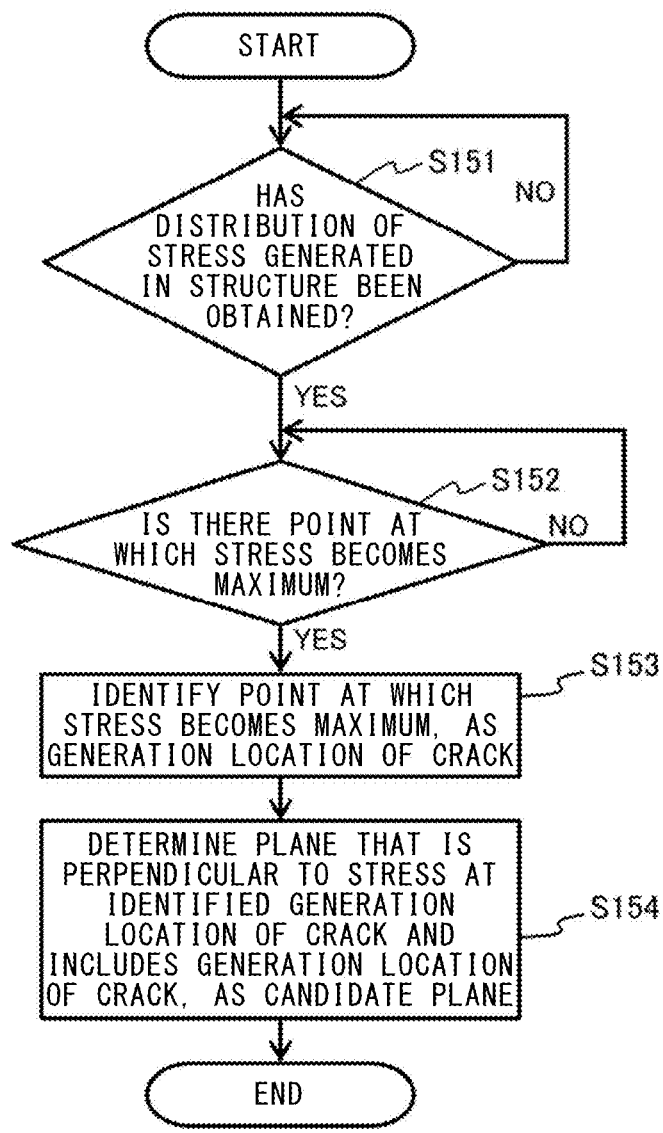
FIG. 31 is a flowchart showing a process of determining the candidate plane in Embodiment 4.

FIG. 31 is a flowchart showing a process of determining the candidate plane 3 in FIG. 30. The process shown in FIG. 31 is executed in the shape model generation unit 31c. In step S151, it is determined whether or not a distribution of stress generated in the structure 1 has been obtained. If the distribution of stress generated in the structure 1 has not been obtained, the process in step S151 is repeated. On the other hand, if the distribution of stress generated in the structure 1 has been obtained, the process proceeds to step S152. In step S152, it is determined whether or not there is a point at which the stress becomes maximum. If there is no point at which the stress becomes maximum, the process in step S152 is repeated. On the other hand, if there is a point at which the stress becomes maximum, the process proceeds to step S153. In step S153, the point at which the stress becomes maximum is identified as a generation location of the crack 4, and the process proceeds to step S154. In step S154, a plane that is perpendicular to the stress at the identified generation location of the crack 4 and includes the generation location of the crack 4 is determined as the candidate plane 3.

The maximum stress $\sigma_{max}$ tends to be generated at a location for which a boundary condition is set. Therefore, so that a boundary condition may be reconsidered after the location where the maximum stress $\sigma_{max}$ is generated is determined.

When the candidate plane 3 is determined by the method described above, it is possible to determine a plane in which the crack 4 is easily generated inside the structure 1, as the candidate plane 3, so that it is possible to improve the accuracy of estimation of the crack 4.

Figure 32:
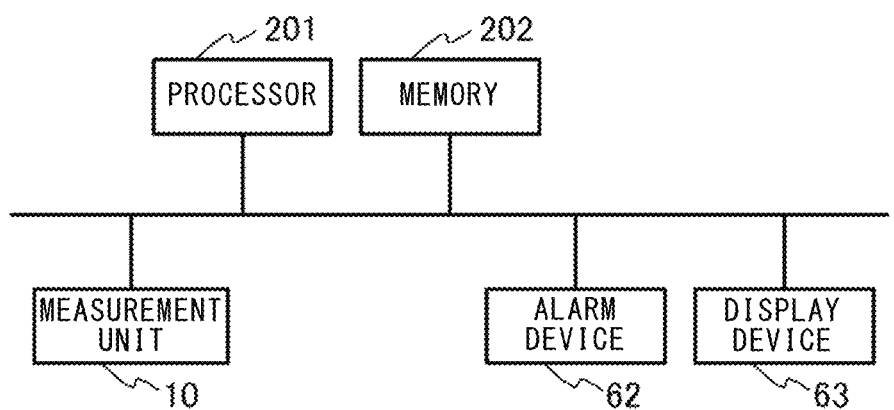
FIG. 32 is a schematic diagram showing an example of hardware of the crack estimation devices according to Embodiment 1, Embodiment 3, and Embodiment 4.
Figure 33:
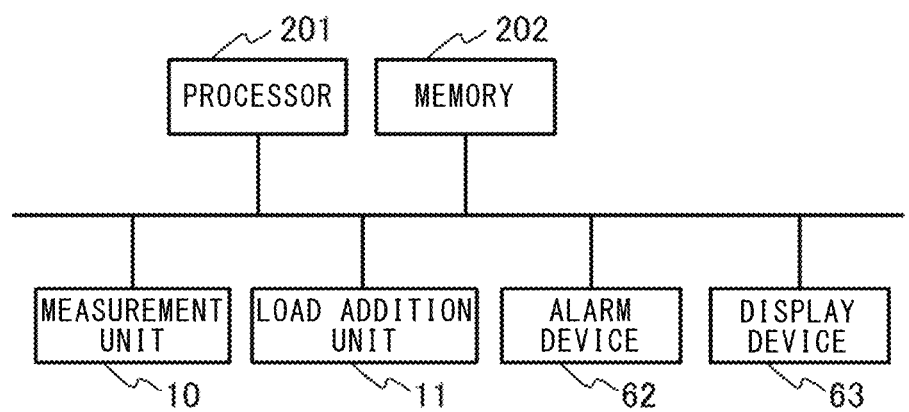
FIG. 33 is a schematic diagram showing an example of hardware of the crack estimation device according to Embodiment 2.

FIG. 32 is a schematic diagram showing an example of hardware of the crack estimation devices according to Embodiment 1, Embodiment 3, and Embodiment 4. FIG. 33 is a schematic diagram showing an example of a hardware configuration of the crack estimation device according to Embodiment 2. The storage unit 50 is realized by a memory 202. The memory 202 is, for example, a nonvolatile or volatile semiconductor memory such as a ROM, a RAM, a flash memory, an EPROM, and an EEPROM, or a magnetic disk, a flexible disk, an optical disk, a compact disk, a mini disk, a DVD, or the like.

The model generation unit 30, 30a, 30b, or 30c, the crack state analysis unit 40, 40a, or 40b, and the output processing unit 61 are realized by a processor 201, such as a CPU and a system LSI, which executes a program stored in the memory 202. A plurality of processing circuits may cooperatively execute the above function. Furthermore, the above function may be realized by dedicated hardware. When the above function is realized by dedicated hardware, the dedicated hardware is, for example, a single circuit, a complex circuit, a programed processor, an ASIC, an FPGA, or a combination thereof. The above function may be realized by a combination of dedicated hardware and software, or a combination of dedicated hardware and firmware. For example, the model generation unit 30, 30a, 30b, or 30c may be realized by dedicated hardware, and the crack state analysis unit 40, 40a, or 40b and the output processing unit 61 may be realized by the processor 201, such as a CPU and a system LSI, which executes a program stored in the memory 202.

Although the disclosure is described above in terms of various exemplary embodiments, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 structure
2 observation plane
3 candidate plane
4 crack
5 tensile load
6 bending moment
7, 8 element
9 side
10, 10b measurement unit
11 load addition unit
20, 20a, 20b estimation unit
30, 30a, 30b, 30c model generation unit
31, 31a, 31c shape model generation unit
32, 32a, 32b estimation model generation unit
33 load setting unit
40, 40a, 40b crack state analysis unit
41, 41a, 41b data acquisition unit
42, 42b crack state estimation unit
43, 43b vector similarity calculation unit
44, 44b crack analysis unit
45 load instruction unit
50 storage unit
60 analysis result output unit 61 output processing unit
62 alarm device
63 display device
70 columnar member
71 inner circumferential surface
72 outer circumferential surface
73 internal pressure
100, 100a, 100b, 100c crack estimation device
201 processor
202 memory

The invention claimed is:

1. A crack estimation device comprising:
a measurement circuitry to set an observation plane in a surface of a structure as a measurement plane and measures deformation of the measurement plane as a measurement plane deformation vector;
a model generator to generate a shape model obtained by modeling a shape of the structure, sets a candidate plane inside the structure as a crack generation plane, and sets deformation of the measurement plane when a crack is generated in the crack generation plane, as a measurement plane estimated change vector for a plurality of types of crack candidates; and
a crack state analyzer to estimate the crack from output of the measurement circuitry and output of the model generator, wherein
the crack state analyzer obtains a similarity between the measurement plane deformation vector and the measurement plane estimated change vector, normalizes the similarity, and estimates the crack generated in the crack generation plane from a result which is obtained by multiplying a vector of a state quantity indicating a state of the crack generation plane by the normalized similarity for each of the crack candidates, and adding together results of the multiplication for all the crack candidates.

2. The crack estimation device according to claim 1, wherein the model generator sets the crack candidate by setting a plurality of start points in advance, and carrying out crack progression on the basis of a condition predetermined from each of the start points.

3. The crack estimation device according to claim 1, wherein the similarity is a Euclidean distance.

4. The crack estimation device according to claim 1, wherein the shape model of the structure is represented in a cylindrical coordinate system.

5. The crack estimation device according to claim 1, wherein
the model generator sets deformation of the measurement plane in a state where a load is applied to the structure, as the measurement plane estimated change vector, and
in a state where the load is applied to the structure, the measurement circuitry measures deformation of the measurement plane as the measurement plane deformation vector.

6. The crack estimation device according to claim 1, wherein the state quantity indicating the state of the crack generation plane is any of a latent variable indicating presence/absence of the crack in the crack candidate in the crack generation plane, a displacement change amount in the crack generation plane, and a load change amount in the crack generation plane.

7. The crack estimation device according to claim 1, wherein
the model generator sets a boundary condition that a node on the crack generation plane is set as the crack, obtains a load change vector using a stiffness matrix, and newly sets the crack candidate by carrying out crack progression with a location where the load change vector becomes maximum, as the next crack,
the model generator repeats newly setting the boundary condition in a state where crack progression is carried out, obtaining the load change vector using the stiffness matrix, and newly setting the crack candidate by carrying out crack progression with a location where the load change vector becomes maximum, as the next crack, and
the model generator creates a latent variable vector indicating presence/absence of the crack in the crack generation plane, a displacement change vector of a displacement change on the crack generation plane, a load change vector indicating a load change on the crack generation plane, and the measurement plane estimated change vector indicating deformation of the measurement plane, as learning data, for all the crack candidates.

8. The crack estimation device according to claim 1, wherein
the measurement circuitry measures at least one of a strain change, a displacement change, and an angle change as deformation of the measurement plane,
when the measurement circuitry measures the strain change, a strain change vector in the observation plane is used as the measurement plane estimated change vector,
when the measurement circuitry measures the displacement change, a displacement change vector in the observation plane is used as the measurement plane estimated change vector, and
when the measurement circuitry measures the angle change, an angle change vector in the observation plane is used as the measurement plane estimated change vector.

9. A crack estimation method comprising:
a data acquisition step of setting an observation plane in a surface of a structure as a measurement plane and measuring deformation of the measurement plane as a measurement plane deformation vector;
a model generation step of generating a shape model obtained by modeling a shape of the structure, setting a candidate plane inside the structure as a crack generation plane, and setting deformation of the measurement plane when a crack is generated in the crack generation plane, as a measurement plane estimated change vector for a plurality of types of crack candidates; and
a crack state estimation step of estimating the crack from a value obtained in the data acquisition step and a value obtained in the model generation step, wherein
the crack state estimation step includes obtaining a similarity between the measurement plane deformation vector and the measurement plane estimated change vector, normalizing the similarity, and estimating the crack generated in the crack generation plane from a result which is obtained by multiplying a vector of a state quantity indicating a state of the crack generation plane by the normalized similarity for each of the crack candidates, and adding together results of the multiplication for all the crack candidates.

10. The crack estimation method according to claim 9, wherein the model generation step includes setting the crack candidate by setting a plurality of start points in advance, and carrying out crack progression on the basis of a condition predetermined from each of the start points.

11. The crack estimation method according to claim 9, wherein the model generation step includes
- setting a boundary condition that a node on the crack generation plane is set as the crack, obtaining a load change vector using a stiffness matrix, and newly setting the crack candidate by carrying out crack progression with a location where the load change vector becomes maximum, as the next crack,
- repeating newly setting the boundary condition in a state where crack progression is carried out, obtaining the load change vector using the stiffness matrix, and newly setting the crack candidate by carrying out crack progression with a location where the load change vector becomes maximum, as the next crack, and
- creating a latent variable vector indicating presence/absence of the crack in the crack generation plane, a displacement change vector of a displacement change on the crack generation plane, a load change vector indicating a load change on the crack generation plane, and the measurement plane estimated change vector indicating deformation of the measurement plane, as learning data, for all the crack candidates.

12. The crack estimation method according to claim 9, further comprising an analysis result output step of determining a remaining use period of the structure on the basis of information of the estimated crack, a progression amount of the crack obtained from a load applied to the structure and a physical property value of the structure, and limit values of a position and a size of the crack.

13. The crack estimation method according to claim 9, further comprising an analysis result output step of issuing an alarm for promoting stop of use of the structure, on the basis of information of the estimated crack and limit values of a position and a size of the crack.

14. The crack estimation method according to claim 9, wherein the model generation step includes identifying a point at which stress becomes maximum in the structure, as a generation location of the crack.

* * * * *